United States Patent
Ito et al.

(10) Patent No.: US 8,350,507 B2
(45) Date of Patent: Jan. 8, 2013

(54) CONTROLLER OF ROTARY ELECTRIC MACHINE

(75) Inventors: Masato Ito, Tokyo (JP); Yoshihiko Kimpara, Tokyo (JP); Tetsuya Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 485 days.

(21) Appl. No.: 12/679,326

(22) PCT Filed: May 9, 2008

(86) PCT No.: PCT/JP2008/001168
§ 371 (c)(1),
(2), (4) Date: Mar. 22, 2010

(87) PCT Pub. No.: WO2009/040965
PCT Pub. Date: Apr. 2, 2009

(65) Prior Publication Data
US 2010/0194319 A1    Aug. 5, 2010

(30) Foreign Application Priority Data
Sep. 27, 2007  (JP) .................. 2007-250428

(51) Int. Cl.
*H03K 5/00*    (2006.01)
(52) U.S. Cl. .............. 318/400.13; 318/400.01; 318/700
(58) Field of Classification Search ............ 318/400.01, 318/400.13, 700
See application file for complete search history.

(56) References Cited

U.S. PATENT DOCUMENTS

| | | | |
|---|---|---|---|
| 7,190,130 B2 | 3/2007 | Wogari et al. | |
| 2002/0113569 A1 | 8/2002 | Iijima et al. | |
| 2010/0207555 A1* | 8/2010 | Ide et al. ............. | 318/400.02 |
| 2012/0206075 A1* | 8/2012 | Kimpara et al. ....... | 318/400.15 |

FOREIGN PATENT DOCUMENTS

| | | |
|---|---|---|
| JP | 8-149898 | 6/1996 |
| JP | 2000 102300 | 4/2000 |
| JP | 2002 191188 | 7/2002 |
| JP | 2003 52193 | 2/2003 |
| JP | 2005-137106 | 5/2005 |

OTHER PUBLICATIONS

U.S. Appl. No. 13/201,228, filed Aug. 12, 2011, Ito, et al.
U.S. Appl. No. 13/203,069, filed Aug. 24, 2011, Ito, et al.
U.S. Appl. No. 13/255,738, filed Sep. 9, 2011, Kimpara, et al.
Murata, Kazunori et al., "Initial Rotor Position Estimation Characteristics of Mechanical-Current Sensorless IPM Motor Using PWM Harmonics Detected in DC-Bus Current", I.E.E. Japan Industry Application Society Conference, 1-100, pp. 371-372, (2005), (with English abstract).

* cited by examiner

*Primary Examiner* — Kawing Chan
(74) *Attorney, Agent, or Firm* — Oblon, Spivak, McClelland, Maier & Neustadt, L.L.P.

(57) ABSTRACT

A rotary electric machine controller including a current detector detecting rotary electric machine currents generated in a rotary electric machine, a position estimation mechanism outputting an estimated position in accordance with the rotary electric machine currents; a controller outputting voltage commands in accordance with the estimated position; a pulse-width modulator outputting logic signals which are pulse-width modulated in accordance with the voltage commands and with a switching cycle used for pulse-width modulation control; and a voltage application mechanism applying AC voltages for driving the rotary electric machine in accordance with the logic signals. The voltage commands output by the controller are obtained by superimposing, on fundamental voltages for driving the rotary electric machine, position detection voltages which each have a cycle equal to m times of the switching cycle and which are different in phase among respective phases.

10 Claims, 22 Drawing Sheets

(a)

(b)

(a)

|  | V0 | V1 | V2 | V3 | V4 | V5 | V6 | V7 |
|---|---|---|---|---|---|---|---|---|
| Vul | Low | Hi | Hi | Low | Low | Low | Hi | Hi |
| Vvl | Low | Low | Hi | Hi | Hi | Low | Low | Hi |
| Vwl | Low | Low | Low | Low | Hi | Hi | Hi | Hi |

(b)

(c)

(d)

(a)

(b)

(c)

(d)

CONTROLLER OF ROTARY ELECTRIC MACHINE

TECHNICAL FIELD

The present invention relates to a controller of a rotary electric machine, the controller being capable of performing rotation control by obtaining rotor position information without using a rotor position sensor in the rotary electric machine such as an induction machine, a synchronous machine, and the like.

BACKGROUND ART

In order to accurately control a rotation operation of a rotary electric machine, there are required rotor position information of the rotary electric machine and current information about a current flowing in the rotary electric machine. Conventionally, the rotor position information is obtained by separately mounting a rotor position sensor to the rotary electric machine. However, it is considerably disadvantageous to separately mount the rotor position sensor from the viewpoints of cost reduction, space-saving, and improvement in reliability, and thus there is a demand for a sensorless method which does not require the rotor position sensor.

As a sensorless control method not requiring a rotor position sensor in a rotary electric machine, there are mainly the following methods: a method in which a rotor position of a rotary electric machine is estimated based on an induced voltage of the rotary electric machine; and a method in which a rotor position of a rotary electric machine is estimated utilizing a saliency. Since the magnitude of the induced voltage used in the former method is characteristically proportional to a speed of the rotary electric machine, the induced voltage is decreased at a zero-speed or in a low-speed range, and an S/N ratio deteriorates. Therefore, it is difficult to estimate the rotor position of the rotary electric machine. On the other hand, in the latter method which utilizes the saliency, a rotor position estimation signal for estimating a rotor position of a rotary electric machine needs to be injected to the rotary electric machine, however, it is advantageous that the rotor position of the rotary electric machine can be estimated regardless of the speed of the rotary electric machine. Therefore, the sensorless control method utilizing the saliency is employed for position detection in the zero- or low-speed range.

Conventionally, in the sensorless control method utilizing the saliency, in order to generate high-frequency signals (for detecting a position of a magnetic pole rotor), which are different from a driving frequency for a rotary electric machine, as signals for estimating a rotor position, carrier signals of three phases, which each have an arbitrary frequency and are generated by a carrier signal generator, are subjected to phase shift by a phase shifter, and phases of a V-phase and a W-phase are shifted by an angle $\Delta\theta$ and an angle $2\Delta\theta$, respectively, with respect to a U-phase. The phase-shifted signals are compared to voltage command values by using a comparator to generate switching signals which are then inputted to an inverter circuit. In the inverter circuit, high-frequency currents of three phases, which are generated due to driving of the rotary electric machine by the switching signals, are extracted through a band-pass filter (BPF). Next, the high-frequency currents of three phases are converted by a coordinate converter to an $\alpha$-axis, a $\beta$-axis, an $\alpha'$-axis, and an $\beta'$-axis, and peak values of the current components are extracted and then subjected to an averaging process by using an absolute value calculation unit and a low pass filter, and then $\theta$ is estimated by a magnetic pole position calculation unit (see Patent Document 1, for example).

Further, as another conventional method which utilizes the saliency, there is known a method in which a d-q axis rectangular coordinate system, which rotates synchronously with a rotor or a magnetic flux vector, is used as control coordinates, and a high-frequency signal is superimposed on a d-axis excitation current command value, so as to detect currents flowing to the rotary electric machine. Two-phase currents are obtained by three-phase/two-phase conversion of the above currents. The square of the amplitude of a vector of each detected current, which is the square sum of the currents of two phases, is calculated, and the sum between the square of the d-axis excitation current command value and the square of a q-axis torque current command value, i.e., the square of the amplitude of a command current vector, is calculated, and the square of the amplitude of the command current vector is subtracted from the square of the amplitude of the detecting current vector. Based on a value obtained by the subtraction, an error from the control coordinates is calculated, whereby a rotor position in the rotary electric machine is estimated (see Patent Document 2, for example).

On the other hand, current information about a current flowing to a rotary electric machine is conventionally detected by arranging a plurality of current sensors between voltage application means such as an inverter or the like and the rotary electric machine, and by detecting, by using the current sensors, the rotary electric machine current flowing between the voltage application means and the rotary electric machine. For example, in the case of a three-phase AC rotary electric machine, rotary electric machine currents of at least two phases, among three phases, are detected using two current sensors. However, arrangement of a plurality of current sensors requires extra costs. Thus, for the sake of reduction in costs of the current sensors, there is a method in which only one current sensor is used to detect a value of a DC bus current flowing between a DC voltage source, which is an input source to voltage application means such as an inverter or the like, and the inverter, so as to calculate and identify the phase, of the rotary electric machine, in which the current is flowing at the time of the detection in accordance with the difference in switching patterns of switches of respective phases of the voltage application means such as the inverter or the like.

The above method enhances the reduction in costs of the current sensors. However, when voltage command values are overlapped with or close to each other, for example, when the modulation percentage of fundamental waves for driving a rotary electric machine is small, or when command values of two phases, among voltage command values of three phases, are overlapped with each other, then switching elements of the respective phases of voltage application means, such as an inverter or the like, perform switching substantially simultaneously, which leads to substantially no difference in the switching pattern. Therefore, the method has a problem in that it is difficult to identify the phase, of the rotary electric machine, in which a current is flowing.

To solve the above problem, conventionally proposed is a method which is combined with the sensorless control, and in the method, three phase carriers are prepared to estimate a rotor position by using high-frequency currents generated by three phase carrier modulation, and the three phase carriers utilized for estimation of the rotor position are utilized to generate difference in switching patterns of switching elements of the respective phases of voltage application means, such as an inverter or the like, thereby detecting a DC bus current even when the modulation percentage of fundamental waves for driving the rotary electric machine is small.

Accordingly, it is possible to identify the phase, of the rotary electric machine, in which a current is flowing, and to calculate the current flowing to the rotary electric machine (see Non-patent Document 1, for example).

[Patent Document 1] Japanese Laid-Open Patent Publication No. 2003-52193

[Patent Document 2] Japanese Patent No. 3707528

[Non-patent Document 1] Initial Rotor Position Estimation Characteristics of Mechanical-Current Sensorless IPM Motor Using PWM Harmonics Detected in DC-Bus Current (I.E.E. Japan Industry Application Society Conference 1-100 (2005))

DISCLOSURE OF THE INVENTION

Problems to be Solved by the Invention

In a commercially available general-purpose microcomputer for controlling a rotary electric machine, one carrier signal is used to perform PWM modulation on voltage commands of three phases. On the other hand, in Patent Document 1, in order to generate a position estimation signal, carrier signals of three phases are prepared, and in Non-patent Document 1, in order to calculate a current flowing to a rotary electric machine based on a DC bus current, carrier signals of three phases need to be prepared. In this manner, in the conventional technologies, since carrier signals of three phases need to be prepared, it is difficult to utilize a commercially available general-purpose microcomputer, which results in a problem that an inexpensive configuration cannot be utilized.

Further, since carrier signals of three phases are used, when a current sampling is performed in the vicinity of a peak and a trough of each of carrier signals, there may be a case where the time when a current sampling is performed in one phase coincides with a switching timing of another phase, and consequently the current sampling is affected by ON/OFF of the inverter, which may cause failure in sampling.

Further, in the position estimation method disclosed in Patent Document 2, the position estimation is performed using two pieces of information, i.e., a current command and a detecting current, which leads to a problem of an increase in arithmetic processing for calculating an estimation position by processing the two pieces of information.

The present invention is made to solve the above problems, and an object of the present invention is to provide a controller of a rotary electric machine, the controller being capable of accurately estimating the rotor position and controlling the rotary electric machine by detecting current information about a current flowing to the rotary electric machine with the use of only a single carrier signal and without using a rotor position sensor, in particular.

Further, the present invention is directed to a case where the phase, of the rotary electric machine, in which a current is flowing is determined based on a DC bus current. That is, another object of the present invention is to allow calculation of a current flowing to the rotary electric machine, based on the DC bus current by utilizing a position estimation signal generated using a single carrier signal and a simple configuration, even when voltage command values are overlapped with or close to each other, which cannot be achieved by the conventional technologies.

Solution to the Problems

A controller of a rotary electric machine according to the present invention performs rotation control of the rotary electric machine, and includes: current detection means for detecting rotary electric machine currents flowing to the rotary electric machine; position estimation means for estimating a rotor position in accordance with the rotary electric machine currents detected by the current detection means; control means for outputting voltage commands in accordance with the rotor position estimated by the position estimation means; pulse-width modulation means for outputting logic signals which are pulse-width modulated based on the voltage commands from the control means and on a switching cycle used for pulse-width modulation control; and voltage application means for applying voltages to the rotary electric machine in accordance with the logic signals outputted by the pulse-width modulation means. The voltage commands outputted by the control means are obtained by superimposing, on fundamental voltages for driving the rotary electric machine, position detection voltages which each have a cycle equal to m times (m is an integer of three or more) of the switching cycle and which are different in phase among respective phases.

In this case, a configuration may be applicable in which the current detection means is replaced with bus current detection means for detecting a bus current flowing between the voltage application means and a DC voltage source supplying DC power to the voltage application means, and with rotary electric machine current calculation means for calculating the rotary electric machine currents flowing to the rotary electric machine in accordance with the bus current detected by the bus current detection means, and with both or either of the logic signals and the voltage commands.

EFFECT OF THE INVENTION

In the controller of the rotary electric machine of the present invention, the voltage commands outputted by the control means to the pulse-width modulation means are obtained by superimposing, on the fundamental voltages for driving the rotary electric machine, position detection voltages which each have a cycle equal to m times (m is an integer of three or more) of the switching cycle used for the pulse-width modulation control and which are different in phase among respective phases. Thus, when the AC voltages are applied to drive the rotary electric machine, the rotary electric machine currents flowing to the rotary electric machine include position detection alternating currents having a frequency corresponding to the position detection voltages. Therefore, the rotary electric machine currents are detected by the current detection means, and the position detection alternating currents included in the rotary electric machine currents are extracted by the position estimation means, whereby the rotor position can be estimated.

Accordingly, by using only a single carrier signal, and without using a rotor position sensor particularly, it is possible to accurately estimate the rotor position and control the rotary electric machine by detecting the rotary electric machine currents flowing to the rotary electric machine.

Further, a bus current is detected by bus current detection means, and the rotary electric machine currents flowing to the rotary electric machine are calculated by the rotary electric machine current calculation means in accordance with the bus current and with both or either of the logic signals and the voltage commands, whereby it is possible to reduce the number of pieces of the current detection means, and also possible to enhance cost reduction. Moreover, at the same time, three-phase AC voltages which each have a cycle equal to m times of the switching cycle and which are different in phase among the respective phases are used as the position detection voltages used for position estimation, whereby it is possible to calculate currents flowing to the rotary electric machine by using a simple configuration and based on the DC bus current even when values of the fundamental voltages of three phases for driving the rotary electric machine are substantially identical to one another (when a modulation percentage is small or when two phase of the three phases are overlapped with each other).

A cycle of calculation by the control means is usually set to be equal to or multiple times of the switching cycle. Thus, when a cycle of the position detection voltages of the three-phase AC currents used for position estimation is not multiple times of the switching cycle, the position detection voltages will be discontinuous, and its time average value is not zero, which causes generation of swell. However, in the present invention, the cycle of the position detection voltages of the three-phase AC currents used for the position estimation is set to be equal to m times (m is an integer of three or more) of the switching cycle, and thus, the position detection voltages change continuously, and it is possible to prevent generation of swell.

BEST MODE FOR CARRYING OUT THE INVENTION

First Embodiment

Figure 1:
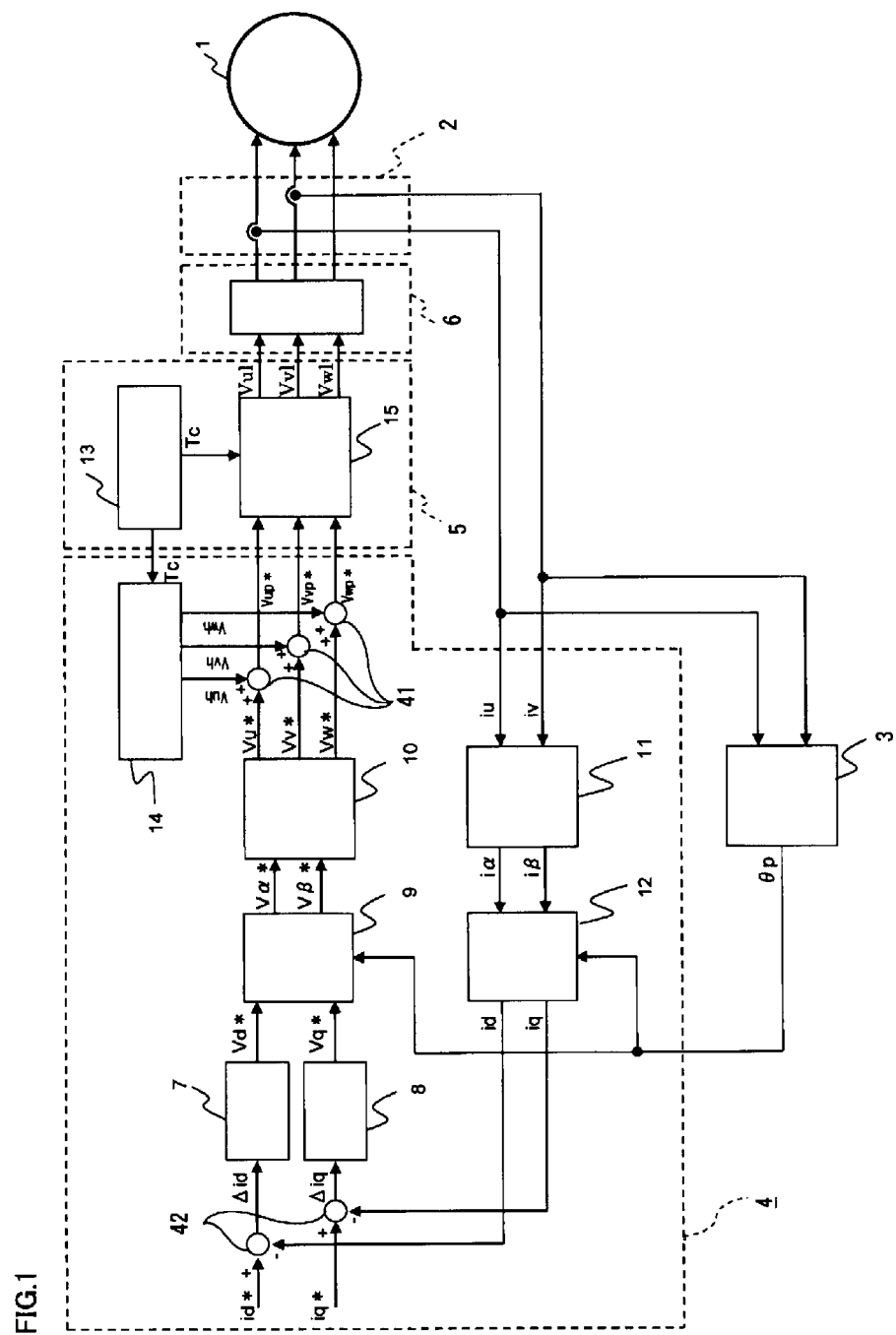
FIG. 1 is a block diagram showing a controller of a rotary electric machine according to a first embodiment of the present invention.
Figure 2:
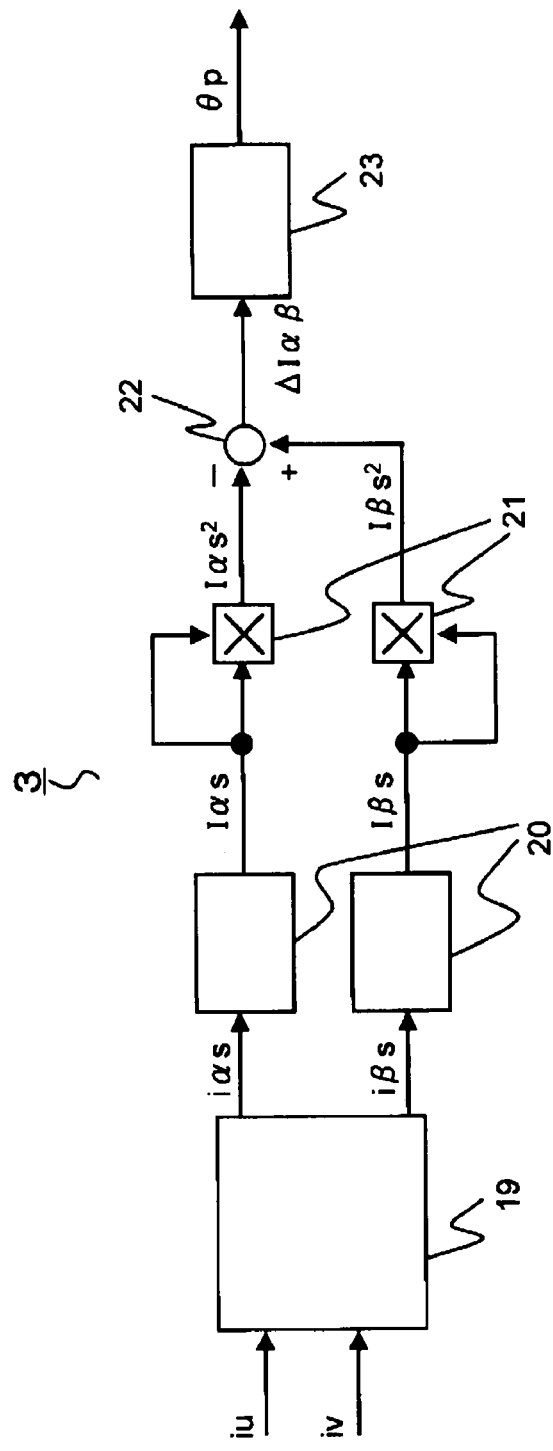
FIG. 2 is a block diagram showing, in detail, position estimation means provided to the controller shown in FIG. 1.

FIG. 1 to FIG. 7 show a first embodiment of the present invention. FIG. 1 is a block diagram showing an overall configuration of a controller of a rotary electric machine, FIG. 2 is a block diagram showing, in detail, position estimation means shown in FIG. 1, and FIG. 3 to FIG. 7 are each a explanatory diagram for operational explanation.

In the first embodiment, a rotary electric machine is, for example, an interior permanent magnet type synchronous machine, and to the rotary electric machine 1, an inverter 6 is connected as voltage application means which applies thereto a predetermined control voltage. In addition, arranged are current detection means 2 which detects rotary electric machine currents iu and iv of two phases flowing between the inverter 6 and the rotary electric machine 1, position estimation means 3 which calculates a rotor position of the rotary electric machine 1, control means 4 (to be described later in detail) which outputs voltage commands Vup*, Vvp*, and Vwp* which are driving voltage commands to be applied to the rotary electric machine 1, pulse-width modulation control means 5 (to be described later in detail) which outputs logic signals Vul, Vvl, and Vwl which are pulse-width modulated in accordance with the voltage commands Vup*, Vvp*, and Vwp* outputted from the control means 4.

The control means 4 includes a subtractor 42, a d-axis current controller 7, a q-axis current controller 8, a coordinate converter 9, a two-phase/three-phase converter 10 as voltage command means, a three-phase/two-phase converter 11, and a coordinate converter 12. The control means 4 also includes a position detection voltage generator 14 and an adder 41. Further, the pulse-width modulation means 5 includes a switching cycle generator 13 as a switching cycle generation section, and a pulse-width modulation controller 15.

The current detection means 2 according to the first embodiment is a current transformer or the like, for example, and detects currents of two phases, i.e., a U-phase current iu and a V-phase current iv, from a power line connecting between the rotary electric machine 1 and the inverter 6. However, alternatively, any currents of two phases among the U-phase current, the V-phase current, and a W-phase current may be detected. Still alternatively, the current detection means 2 may detect currents of three phases, i.e., the U-phase current, the V-phase current, and the W-phase current. Still alternatively, as the current detection means 2, a method utilizing a DC bus current inputted to the inverter 6, which is to be described later, may be used to calculate and detect currents.

As described later in detail, position detection voltages Vuh, Vvh, and Vwh of three phases outputted from the position detection voltage generator 14 are superimposed on fundamental voltages Vup*, Vvp*, and Vwp* for driving the rotary electric machine, and consequently the rotary electric machine currents of two phases, i.e., the U-phase current iu and the V-phase current iv of the rotary electric machine 1, detected by the current detection means 2, include position detection alternating current components which have frequencies corresponding to the position detection voltages Vuh, Vvh, and Vwh.

Accordingly, the position estimation means 3 extracts high-frequency position detection alternating currents which is generated in the rotary electric machine 1 and included in the rotary electric machine currents, and obtains and outputs, based on the position detection currents, information θp of a rotor position. As shown in FIG. 2, the position estimation means 3 is configured such that a three-phase/two-phase converter 19, Fourier transformers 20, two multipliers 21, a subtractor 22, and a position calculation unit 23 are connected sequentially. It is noted that the three-phase/two-phase converter 19 is arranged since conversion to two-phase currents decreases information amount required for position estimation performed in steps thereafter, which leads to a simple calculation. In addition, the Fourier transformer 20 is designed to extract the position detection alternating currents included in the rotary electric machine currents.

The d-axis current controller 7 uses proportional-plus-integral control or the like to eliminate a deviation Δid between a d-axis current command value id* and id outputted from the coordinate converter 12, the deviation Δid being obtained from the subtractor 42, thereby outputting a d-axis fundamental voltage Vd*. The q-axis current controller 8 uses the proportional-plus-integral control or the like to eliminate a deviation Δiq between a q-axis current command value iq* and iq outputted from the coordinate converter 12, the deviation Δiq being obtained from the subtractor 42, thereby outputting a q-axis fundamental voltage Vq*. The coordinate converter 9 uses the rotor position information outputted by the position estimation means 3 so as to convert the d-axis fundamental voltage Vd* and the q-axis fundamental voltage Vq* into fundamental voltages Vα* and Vβ* on fixed two axes (α-β axes). In addition, the two-phase/three-phase converter 10 converts the fundamental voltages Vα* and Vβ* into fundamental voltages Vu*, Vv*, and Vw* of three phases, each in the form of a sine waveform or the like.

On the other hand, the three-phase/two-phase converter 11 converts the U-phase current iu and the V-phase current iv, which are detected by the current detection means 2, into currents iα and iβ on the fixed two axes (α-β axes). In addition, the coordinate converter 12 uses the information θp of the rotor position outputted by the position estimation means 3 to convert the iα and iβ into the currents id and iq on rotating two axes (d-q axes).

The switching cycle generator 13 outputs a value of a switching cycle Tc to the pulse-width modulation controller 15 and to the position detection voltage generator 14. It is noted that the switching cycle Tc has a significantly shorter cycle than cycles of the fundamental voltages Vu*, Vv*, and Vw* of three phases, and the switching cycle Tc is set, in advance, to an optimal value in consideration of electrical characteristics of the rotary electric machine 1, a frequency of an electromagnetic noise generated due to inverter drive, and the like.

The position detection voltage generator 14 generates position detection voltages Vuh, Vvh, and Vwh, which each have a cycle m·Tc that is equal to m times (m is an integer of three or more, and the reason of "three or more" will be described later) of the switching cycle Tc provided from the switching cycle generator 13 and which are different in phase from one another, so as to be outputted to the adder 41.

The adder 41 superimposes the position detection voltages Vuh, Vvh, and Vwh at high frequencies (cycle m·Tc), which are outputted from the position detection voltage generator 14, on the fundamental voltages Vu*, Vv*, and Vw* which are outputted from the two-phase/three-phase converter 10, and outputs voltage commands Vup*, Vvp*, and Vwp*, as the resultants, to the pulse-width modulation controller 15. Here, the reason why m is an integer of three or more is that when m is 1 or 2, the position detection voltages Vuh, Vvh, and Vwh of three phases, each having a cycle equal to the cycle m·Tc, i.e., m times of the switching cycle Tc, are not different in phase from one another, and consequently it is impossible to accurately obtain the information θp of the rotor position by using the position estimation means 3.

In the above configuration, the adder 41 of the control means 4 superimposes the position detection voltages Vuh, Vvh, and Vwh on the fundamental voltages Vu*, Vv*, and Vw* of three phases, respectively and individually, and applies the resultants to the rotary electric machine 1. In this case, a voltage vector, which is a vector sum of the position detection voltages Vuh, Vvh, and Vwh, represents a rotating voltage, instead of an alternating voltage. The alternating voltage is a voltage indicating voltage vectors in two or less directions during a cycle of the three-phase AC voltages, the voltage vectors being the sum of vectors in respective phases of the three-phase AC voltages being applied. On the other hand, the rotating voltage is a voltage indicating voltage vectors in three or more directions during a cycle of the three-phase AC voltages, the voltage vectors being the sum of vectors in respective phases of the three-phase AC voltages being applied.

Figure 3:
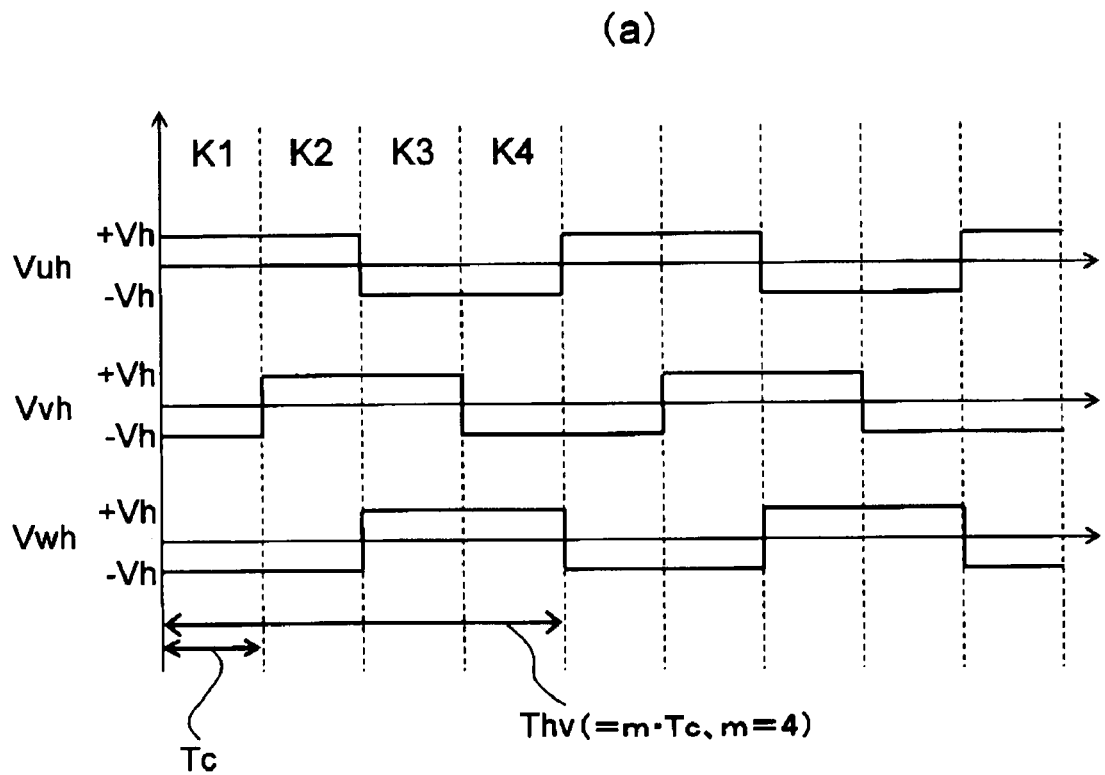
FIG. 3 is an explanatory diagram illustrating an operation in the first embodiment.
Figure 3:
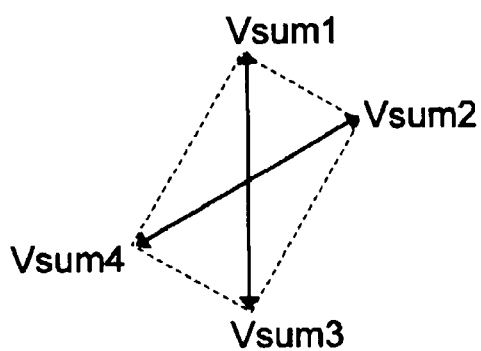

As examples of the position detection voltages Vuh, Vvh, and Vwh outputted by the position detection voltage generator 14, voltage waveforms thereof in the case of m=4 are shown in FIG. 3(*a*), where a switching cycle Tc and a position detection voltage cycle Thv (=4·Tc) are used. Further, a vector diagram of a voltage vector Vsum, which is the vector sum of the position detection voltages Vuh, Vvh, and Vwh, is shown in FIG. 3(*b*). In FIG. 3(*a*), +Vh and −Vh, each having an arbitrary value, are alternately outputted at every two intervals, and the phase difference among the respective phases is one interval. In this case, the voltage vector Vsum, which is the vector sum of the position detection voltages Vuh, Vvh, and Vwh, represents a rotating voltage which indicates Vsum1 to Vsum4 in this order in intervals K1 to K4 (FIG. 3(*a*)), respectively, during one cycle of the three-phase AC voltage as shown in FIG. 3(*b*).

Figure 4:
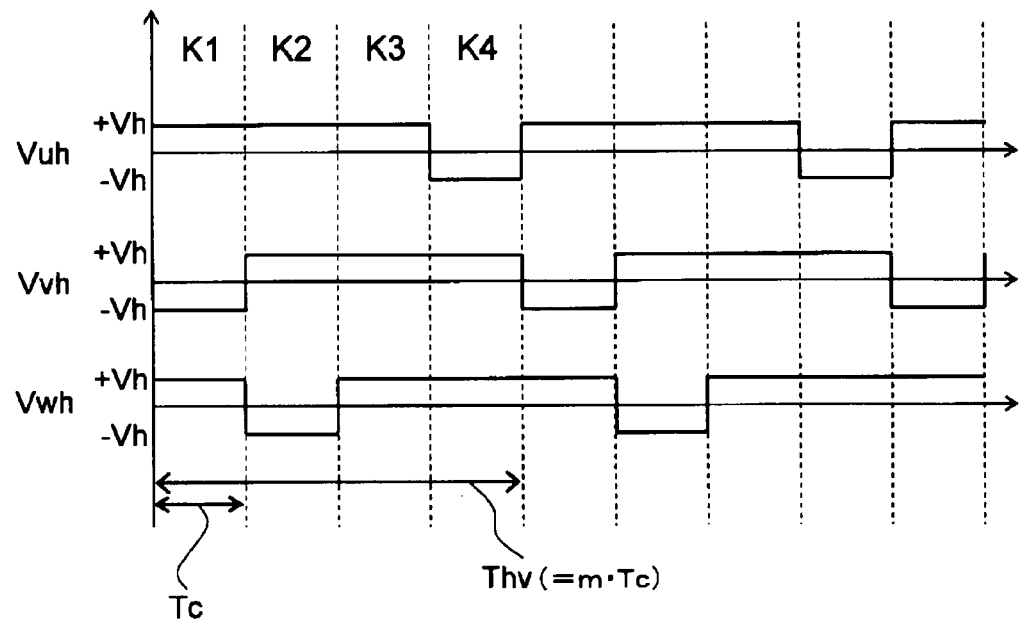
FIG. 4 is an explanatory diagram illustrating an operation in the first embodiment.

It is noted that the number of intervals in which each of the position detection voltages Vuh, Vvh, and Vwh is either +Vh or −Vh need not be two intervals, but may be one interval. Alternatively, as shown in FIG. 4, the number of the intervals may be three intervals. However, when three-phase AC voltages, which each have a cycle that is m times of the switching cycle and which are different in phase from one another, are outputted, the number of intervals of either +Vh or −Vh needs to be in the range of 1 to (m−1), and in addition, the sum of the number of intervals of +Vh and −Vh needs to be m intervals. Further, the phase difference among the respective phases need not necessarily be one interval as shown in FIG. 3($a$), but may be two intervals, three intervals, or the like. However, when three-phase AC voltages, which each have a cycle that is m times of the switching cycle and which are different in phase from one another, are outputted, the phase difference among the respective phases needs to be in the range of 1 to (m−1). Further, the position detection voltages Vuh, Vvh, and Vwh, need not necessarily be represented by square waves which are shown in FIG. 3 and FIG. 4, but may be represented by sine waves.

By using the voltage commands Vup*, Vvp*, and Vwp* outputted by the control means 4 and the value of the switching cycle Tc outputted by the switching cycle generator 13, the pulse-width modulation controller 15 generates logic signals Vul, Vvl, and Vwl which are pulse-width modulated and which are supplied to the inverter 6. As a pulse-width modulation control method, any of the following methods may be used, i.e., (a) a pulse-width modulation control method using a triangle wave Cs as a carrier signal, (b) a pulse-width modulation control method using a saw-tooth wave Wst as a carrier signal, and (c) a pulse-width modulation control method using instantaneous space voltage vector Vs.

Figure 5:
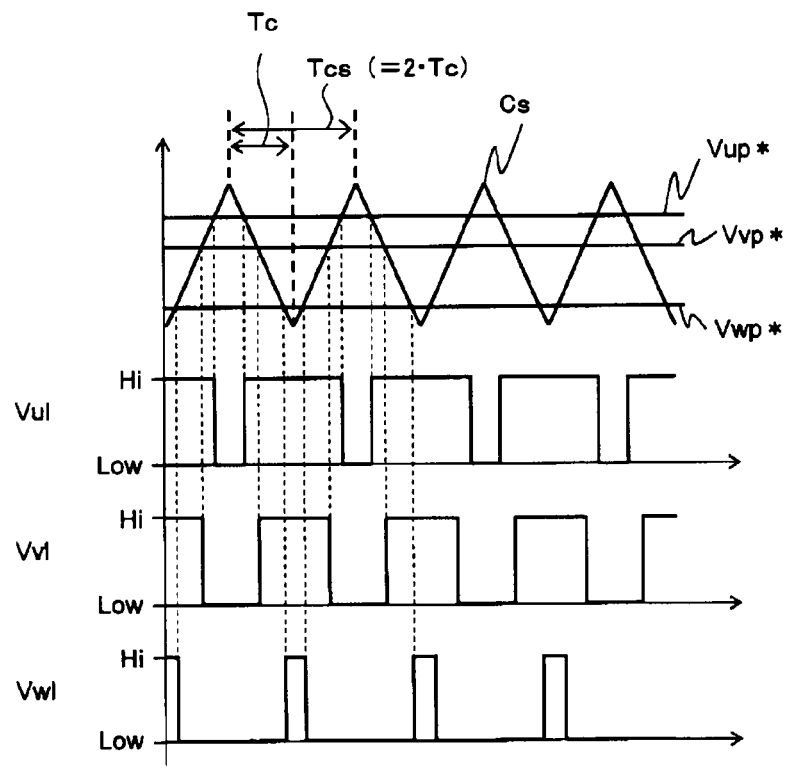
FIG. 5 is an explanatory diagram illustrating an operation in the first embodiment.

First, the pulse-width modulation control method using the triangle wave Cs will be described. FIG. 5 shows a waveform of the pulse-width modulation operation in the case where the pulse-width modulation control method using the triangle wave Cs is used. In the pulse-width modulation control method using the triangle wave Cs, a cycle Tcs of the triangle wave Cs is set to two times (i.e., Tcs=2Tc) of the switching cycle Tc outputted by the switching cycle generator 13.

With reference to FIG. 5, the pulse-width modulation operation performed by the pulse-width modulation controller 15 will be described, specifically. It is noted that, in FIG. 5, although the voltage commands Vup*, Vvp*, and Vwp* are sine wave signals, the voltage commands are represented linearly since the frequencies of the voltage commands are lower as compared to the carrier signal of the triangle wave Cs or the position detection voltages Vuh, Vvh, and Vwh. Further, although the position detection voltages Vuh, Vvh, and Vwh are superimposed on the voltage commands Vup*, Vvp*, and Vwp*, actually, the superimposed voltages are omitted from the drawing since the pulse-width modulation operation will be explained herein.

As shown in FIG. 5, the magnitude relation between the triangle wave Cs and each of the voltage commands Vup*, Vvp*, and Vwp* is obtained. When the magnitude of each of the voltage commands Vup*, Vvp*, and Vwp* is greater than the magnitude of the triangle wave Cs, then a Hi logic signal is outputted. On the other hand, when the magnitude of each of the voltage commands is lower, a Low logic signal is outputted. It may be set such that upon comparison of the magnitude between the triangle wave Cs and each of the voltage commands Vup*, Vvp*, and Vwp*, when the magnitude of each of the voltage commands Vup*, Vvp*, and Vwp* is greater than the magnitude of the triangle wave Cs, then a Low logic signal is outputted, whereas when the magnitude of each of the voltage commands is lower, then a Hi logic signal is outputted.

Figure 6:
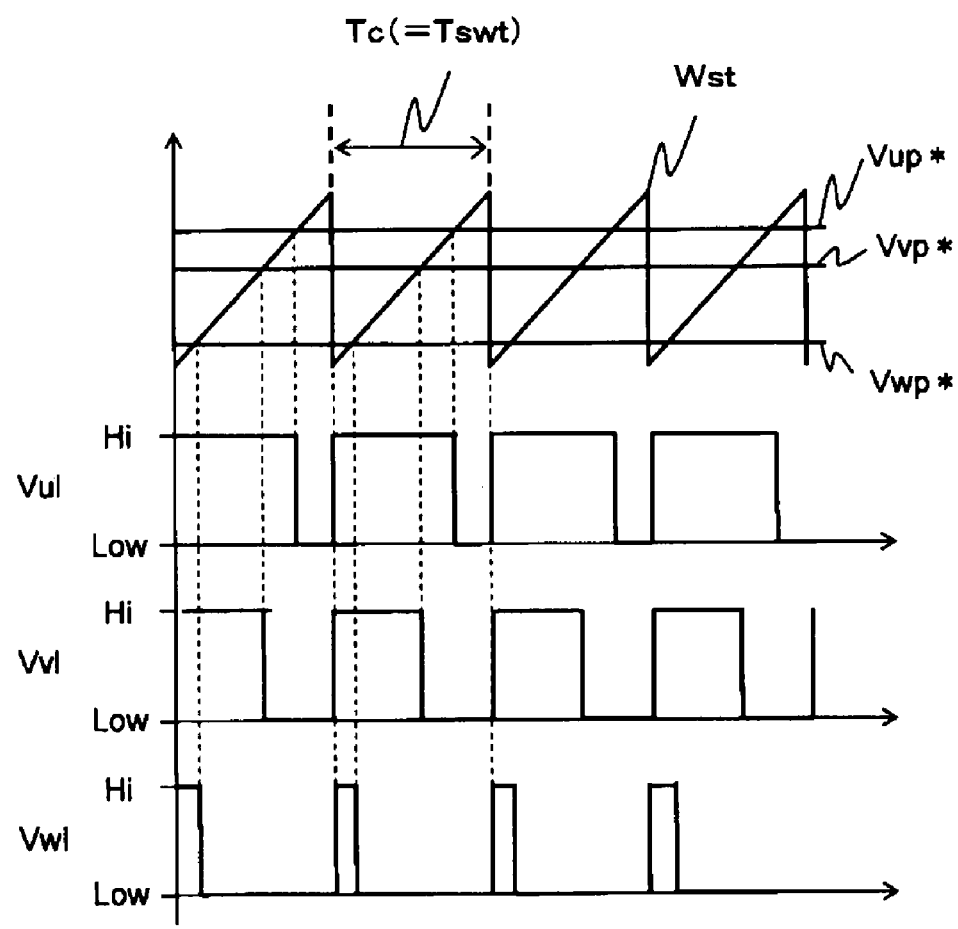
FIG. 6 is an explanatory diagram illustrating an operation in the first embodiment.

Next, a pulse-width modulation control method using the saw-tooth wave Wst will be described. FIG. 6 is a waveform of the pulse-width modulation operation in the case where the pulse-width modulation control method using the saw-tooth wave Wst is used. In the pulse-width modulation control method using the saw-tooth wave Wst, the cycle Twst of the saw-tooth wave Wst is the same as the switching cycle Tc outputted by the switching cycle generator 13.

With reference to FIG. 6, the pulse-width modulation operation will be described specifically. As shown in FIG. 6, the magnitude relation between the saw-tooth wave Wst and each of the voltage commands Vup*, Vvp*, and Vwp* is obtained. When the magnitude of each of the voltage commands Vup*, Vvp*, and Vwp* is greater than the magnitude of the saw-tooth wave Wst, a Hi logic signal is outputted, whereas when the magnitude of each of the voltage commands is lower, a Low logic signal is outputted. It may be set such that upon comparison of the magnitude between the saw-tooth wave Wst and each of the voltage commands Vup*, Vvp*, and Vwp*, when the magnitude of the voltage commands Vup*, Vvp*, and Vwp* is greater than the magnitude of the saw-tooth wave Wst, a Low logic signal is outputted, whereas when the voltage commands are lower, a Hi logic signal is outputted.

Next, a pulse-width modulation control method using the instantaneous space voltage vector Vs will be described. In the pulse-width modulation control method, the vector sum of the voltage commands Vup*, Vvp*, and Vwp* outputted by the control means 4 is set as the instantaneous space voltage vector Vs, and logic signals Vul, Vvl, and Vwl are time-shared and combined within an arbitrary time frame Tf so that the magnitude and the direction thereof coincide with the magnitude and the direction of the instantaneous space voltage vector Vs, whereby an average of the vector sum of the logic signals within the arbitrary time frame Tf is controlled so as to coincide with the instantaneous space voltage vector Vs. In the present embodiment, the arbitrary time frame Tf is the same as the switching cycle Tc outputted by the switching cycle generator 13.

Figure 7:
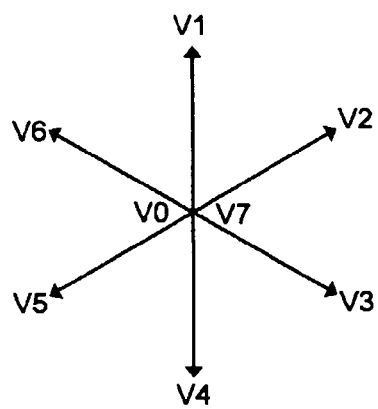
FIG. 7 is an explanatory diagram illustrating an operation in the first embodiment.
Figure 7:
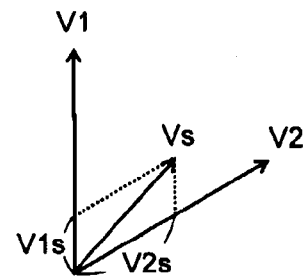
Figure 7:
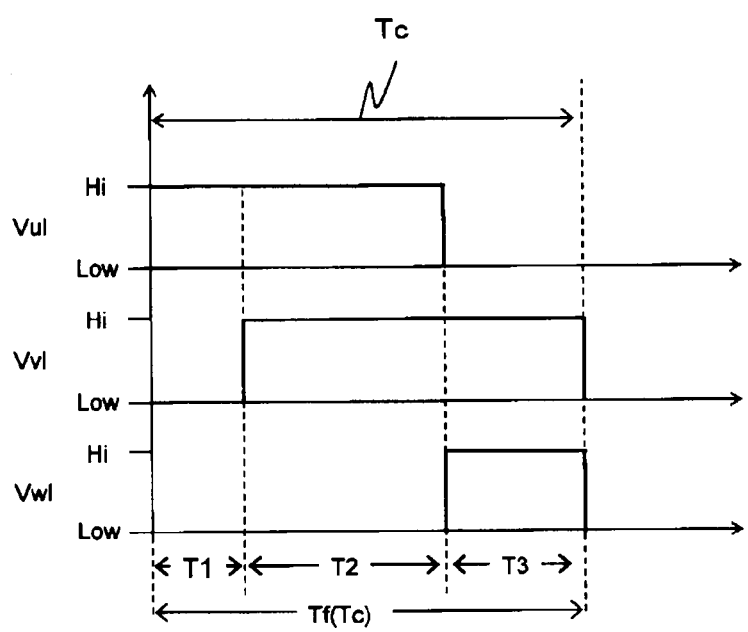

With reference to FIG. 7, the pulse-width modulation operation will be described specifically. FIG. 7 is an explanatory diagram illustrating an operation of the instantaneous space voltage vector control method. FIG. 7($a$) is a diagram showing combinations of logic signals outputted by the pulse-width modulation controller 15, and FIG. 7($b$) is a diagram showing eight voltage vectors obtained by combining the logic signals shown in FIG. 7($a$). A vector V0 and a vector V7 shown in FIG. 7($a$) and FIG. 7($b$) are each indicated as a zero-voltage vector since the vector V0 and the vector V7 represent Low and Hi in their all switches, respectively, and thus the vectors do not have magnitude or direction. For example, as shown in FIG. 7($c$), suppose a case where the instantaneous space voltage vector Vs, which is a vector sum of the voltage commands Vup*, Vvp*, and Vwp* outputted by the control means 4, is provided, and the instantaneous space voltage vector Vs is outputted during the arbitrary time frame Tf. The instantaneous space voltage vector Vs can be divided into a vector V1 direction and a vector V2 direction, and the magnitude of the instantaneous space voltage vector Vs divided into the vector V1 direction is regarded as V1$s$, and the magnitude of that divided into the vector V2 direction is regarded as V2$s$.

Based on the V1s and V2s, output time T1 of the vector V1 and output time T2 of the vector V2 during the arbitrary time frame Tf are calculated using Formulas (1) and (2) described below.

[Formula 1]

$$T1 = V1s \div V1 \times Tf \quad (1)$$

[Formula 2]

$$T2 = V2s \div V2 \times Tf \quad (2)$$

Further output time T3 of the zero-voltage vector during the arbitrary time frame Tf is calculated using Formula (3) described below.

[Formula 3]

$$T3 = Tf - T1 - T2 \quad (3)$$

As described above, the output times T1, T2, and T3 are calculated, and based on the respective output times T1 to T3, combinations of the logic signals of the vector V1, the vector V2, and the vector V0 or V7 are outputted from the pulse-width modulation controller 15, as shown in FIG. 7(d). Accordingly, the average in the output times during the arbitrary time frame Tf is set to coincide with the instantaneous space voltage vector Vs.

When the zero-voltage vector is outputted, the combinations of logic signals of both the vector V0 and the vector V7 may be used. However, when the respective phase voltages are viewed from a neutral point of the rotary electric machine 1, whichever of the vector V0 and the vector V7 may be used, the potentials of the respective phase voltages of the rotary electric machine 1 are equal to each other and do not show any difference. Thus, it is not necessary to use both of the vector V0 and the vector V7, but a combination of logic signals of only either one thereof may be used.

Next, an operation of the position estimation means 3 will be described.

As shown in FIG. 2, the three-phase/two-phase converter 19 converts rotary electric machine currents iu and iv which are detected by the current detection means 2 to two-phase currents iαs and iβs on an α-β axis system. As described above, the position detection voltages Vuh, Vvh, and Vwh, which are higher frequency voltages than the fundamental voltages are superimposed on the three-phase fundamental voltages Vu*, Vv*, and Vw*, and accordingly, high-frequency position detection alternating currents corresponding to the position detection voltages Vuh, Vvh, Vwh are generated in the rotary electric machine currents detected by the current detection means 2. Therefore, Fourier transformers 20 arranged subsequently extract the amplitudes (magnitude) Iαs and Iβs of the position detection alternating currents from the two-phase currents iαs and iβs, which are outputs from the three-phase/two-phase converter 19. Subsequently, for the sake of simple calculation processing, the multipliers 21 square Iαs and Iβs, which are outputs from the Fourier transformers 20, respectively, and then output (Iαs·Iαs) and (Iβs·Iβs). Next, the subtractor 22 outputs difference ΔIαβ therebetween by subtracting (Iαs·Iαs) from (Iβs·Iβs). The position calculation unit 23 then calculates a rotor position θp, based on the difference ΔIαβ, which is an output of the subtractor 22.

The rotor position θp obtained as above is not based on direct detection of the position using a sensor or the like, but is based on an estimate value obtained by calculation. That is, obtaining the rotor position θp in the present invention indicates that it is possible to estimate an accurate rotor position sensorlessly. Hereinafter, details of processing of obtaining the rotor position θp by position estimation means 3 will be described, further specifically.

In the case where the rotary electric machine 1 is an interior permanent magnet synchronous machine, a voltage equation on fixed rectangular coordinates (α-β axes) can be expressed as Formula (4) described below.

[Formula 4]

$$\begin{bmatrix} V\alpha s \\ V\beta s \end{bmatrix} = \begin{bmatrix} R + PL\alpha & PL\alpha\beta \\ PL\alpha\beta & R + PL\beta \end{bmatrix} \begin{bmatrix} i\alpha s \\ i\beta s \end{bmatrix} + \omega\phi \begin{bmatrix} -\sin\theta \\ \cos\theta \end{bmatrix} \quad (4)$$

where,

[Vαs Vβs]$^T$: voltage value on fixed rectangular coordinates
[iαs iβs]$^T$: current value on fixed rectangular coordinates (two-phase currents)
R: stator resistance, P: differential operator
Ld: d-axis inductance, Lq: q-axis inductance
ω: rotational angular velocity (electrical angle)
θ: phase difference between α-axis and magnetic pole $$\begin{cases} L = (Ld + Lq)/2 \\ l = (Ld - Lq)/2 \end{cases} \quad \begin{cases} L\alpha = L + l\cos 2\theta \\ L\beta = L - l\cos 2\theta \\ L\alpha\beta = l\sin 2\theta \end{cases}$$

Suppose that the rotary electric machine 1 is in a stopped state or in a low-speed operation state. When ω is set to satisfy ω=0, and the differential operator P is replaced with a Laplace operator s, the currents iαs and iβs in the fixed rectangular coordinates is expressed as Formula (5) below.

[Formula 5]

$$\begin{bmatrix} i\alpha s \\ i\beta s \end{bmatrix} = \begin{bmatrix} R + sL\alpha & sL\alpha\beta \\ sL\alpha\beta & R + L\beta \end{bmatrix}^{-1} \begin{bmatrix} v\alpha s \\ v\beta s \end{bmatrix} \quad (5)$$

Here, when the position detection voltages Vuh, Vvh, and Vwh each having an angular frequency ωh, which is sufficiently higher than the angular frequency of the AC voltages for driving the rotary electric machine 1 are applied from the position detection voltage generator 14, R<<Lα·ωh and R<<Lβ·ωh are satisfied (in the case of s=jωh (j is an imaginary unit)). When the effect of a stator resistance R is ignored, Formula (5) is expressed as Formula (6) below.

[Formula 6]

$$\begin{aligned} \begin{bmatrix} i\alpha s \\ i\beta s \end{bmatrix} &= \begin{bmatrix} sL\alpha & sL\alpha\beta \\ sL\alpha\beta & sL\beta \end{bmatrix}^{-1} \begin{bmatrix} v\alpha s \\ v\beta s \end{bmatrix} \\ &= \frac{1}{s^2(L\alpha L\beta - L\alpha\beta^2)} \begin{bmatrix} sL\beta & -sL\alpha\beta \\ -sL\alpha\beta & sL\alpha \end{bmatrix} \begin{bmatrix} v\alpha s \\ v\beta s \end{bmatrix} \\ &= \frac{1}{(L^2 - l^2)s} \begin{bmatrix} L - l\cos 2\theta & -l\sin 2\theta \\ -l\sin 2\theta & L + l\cos 2\theta \end{bmatrix} \begin{bmatrix} v\alpha s \\ v\beta s \end{bmatrix} \end{aligned} \quad (6)$$

Further, the position detection voltages Vuh, Vvh, and Vwh applied by the position detection voltage generator can be expressed as Formula (7) below, on the fixed rectangular coordinates.

[Formula 7]

$$\begin{cases} V\alpha sh = V\alpha\beta h \cdot \sin\omega h \cdot t \\ V\beta sh = V\alpha\beta h \cdot \cos\omega h \cdot t \end{cases} \quad (7)$$

where, $[V\alpha sh \; V\beta sh]^T$: position detection voltage values on fixed rectangular coordinates $V\alpha\beta h$: amplitude of position detection voltages on fixed rectangular coordinates $\omega h$: angular frequency of position detection voltages The position detection voltage values in Formula (7) on the fixed rectangular coordinates are expressed as Formula (8) below.

[Formula 8]

$$[V\alpha sh \; V\beta sh]^T \quad (8)$$

Therefore, when values of the position detection voltages in Formula (8) are substituted for [V$\alpha$s V$\beta$s], in Formula (6), on the fixed rectangular coordinate system, and when s=j$\omega$h (j is an imaginary unit) is applied, Formula (9) as follows can be obtained.

[Formula 9]

$$\begin{aligned} i\alpha s &= \frac{V\alpha\beta h}{(L^2-l^2)j\omega h}\{(L-l\cos2\theta)\sin\omega h \cdot t - l\sin2\theta\cos\omega h \cdot t\} \\ &= -j\frac{V\alpha\beta h}{(L^2-l^2)\omega h}\sqrt{L^2+l^2-2Ll\cos2\theta} \cdot \sin(\omega h \cdot t - \varphi\alpha) \\ i\beta s &= \frac{V\alpha\beta h}{(L^2-l^2)j\omega h}\{-l\sin2\theta\sin\omega h \cdot t + (L+l\cos2\theta)\cos\omega h \cdot t\} \\ &= -j\frac{V\alpha\beta}{(L^2-l^2)\omega h}\sqrt{L^2+l^2+2Ll\cos2\theta} \cdot \cos(\omega h \cdot t + \varphi\beta) \end{aligned} \quad (9)$$

where, $$\varphi\alpha = \tan^{-1}\left(\frac{l\sin2\theta}{L-l\cos2\theta}\right)$$

$$\varphi\beta = \tan^{-1}\left(\frac{l\sin2\theta}{L+l\cos2\theta}\right)$$

As shown in Formula (9), it is found that the amplitudes of the currents i$\alpha$s and i$\beta$s on the fixed rectangular coordinates include rotor position information θ (=rotor position θp). Therefore, by using the Fourier transformers 20, the amplitudes I$\alpha$s and I$\beta$s of the currents i$\alpha$s and i$\beta$s on the fixed rectangular coordinates are extracted. That is, by using the Fourier transformers 20, the currents i$\alpha$s and i$\beta$s of high frequency, which are caused by the position detection voltages Vuh, Vvh, and Vwh, are extracted from the rotary electric machine currents, and the amplitudes I$\alpha$s and I$\beta$s thereof are obtained. Based on the extracted amplitudes I$\alpha$s and I$\beta$s, calculation using the following Formula (10) is performed. Accordingly, it is possible to extract a term which includes the rotor position information θ only. To realize the calculation, the multipliers 21 are used to square the amplitudes I$\alpha$s and I$\beta$s, respectively, and the subtractor 22 is used to subtract (I$\alpha$s·I$\alpha$s) from (I$\beta$s·I$\beta$s), which are outputs from the multipliers 21, and to output ΔI$\alpha\beta$ which includes information of the rotor position θ.

[Formula 10]

$$\begin{aligned} \Delta I\alpha\beta &= I\beta s^2 - I\alpha s^2 \\ &= \left\{-j\frac{V\alpha\beta h}{(L^2-l^2)\omega h}\sqrt{L^2+l^2+2Ll\cos2\theta}\right\}^2 - \\ &\quad \left\{-j\frac{V\alpha\beta h}{(L^2-l^2)\omega h}\sqrt{L^2+l^2-2Ll\cos2\theta}\right\}^2 \\ &= \frac{4V\alpha\beta h^2 Ll}{(L^2-l^2)^2\omega h^2}\cos2\theta \end{aligned} \quad (10)$$

In the position calculation unit 23, ΔI$\alpha\beta$ in Formula (10) is divided by Formula (II) below, whereby only cos 2θ is extracted. By calculating an inverse cosine of cos 2θ, θ (rotor position θp) is obtained. As to the calculation of the rotor position θp, the rotor position θp may be obtained not by using the inverse cosine operation, but by preparing a table having stored therein values of cos 2θ and by using the values of cos 2θ stored in a storage device.

[Formula 11]

$$\frac{4V\alpha\beta h^2 Ll}{(L^2-l^2)^2\omega h^2} \quad (11)$$

As described above, in the first embodiment, based on the switching cycle Tc, the position detection voltages Vuh, Vvh, and Vwh, which each have a cycle m·Tc that is m times (m is an integer of three or more) of the switching cycle Tc and which are different in phases from one another, are superimposed on the fundamental voltages Vu*, Vv*, and Vw*, and the resultants are outputted. Thus, unlike the conventional art, it is not necessary to generate carrier signals of three phases, and it is possible to easily output the position detection voltages (position detection voltage commands). In addition, since the rotor position can be obtained by using the rotary electric machine currents only, it is possible to estimate the rotor position of the rotary electric machine 1 with a simple configuration, and also possible to simplify calculations, which leads to a reduction in the computational complexity. Further, even when a current sampling is performed in the vicinity of a peak or a trough of a carrier signal of a triangle wave, a saw-tooth wave, or the like, it is not necessary to generate carrier signals of three phases. Therefore, it is possible to perform the current sampling while reducing the effect of a switching noise or the like caused by inverter switching.

Second Embodiment

Figure 8:
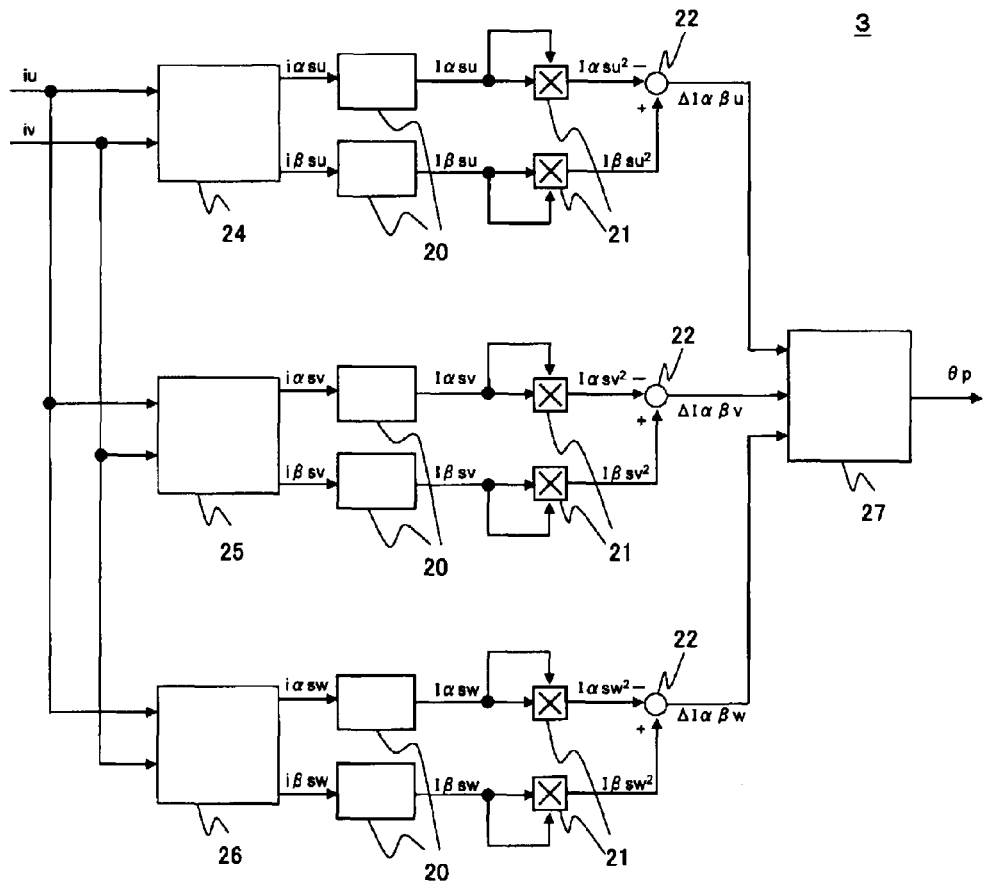
FIG. 8 is a block diagram showing, in detail, position estimation means provided to a controller according to a second embodiment of the present invention.

FIG. 8 is a block diagram showing position estimation means in a controller of a rotary electric machine according to a second embodiment of the present invention.

In the position estimation means 3 of the first embodiment, the rotor position θp is calculated by using the inverse cosine operation, or by preparing a table having a value of cos 2θ stored therein and using the value. However, in such methods, there may be a possibility of an increase in the computational complexity. Thus, in the second embodiment, the computational complexity is reduced as compared to the first embodiment, and the rotor position θp is obtained simply.

In FIG. 8, the position estimation means 3 includes three circuits: i.e., a first circuit including a three-phase/two-phase converter 24, Fourier transformers 20, multipliers 21, and a subtractor 22; a second circuit including a three-phase/two-phase converter 25, Fourier transformers 20, multipliers 21, and a subtractor 22; and a third circuit including a three-phase/two-phase converter 26, Fourier transformers 20, multipliers 21, and a subtractor 22. An output from each of the subtractors 22 is provided to a position calculation unit 27.

The three-phase/two-phase converter 24 in the first circuit performs three-phase/two-phase conversion so that a stator U-phase direction coincides with a directions of two-phase currents after conversion, and outputs two-phase currents $i\alpha su$ and $i\beta su$. The three-phase/two-phase converter 25 in the second circuit performs the three-phase/two-phase conversion so that a stator V-phase direction coincides with a directions of two-phase currents after conversion, and outputs two-phase currents $i\alpha sv$ and $i\beta sv$. The three-phase/two-phase converter 26 in the third circuit performs the three-phase/two-phase conversion so that a stator W-phase direction coincides with a directions of two-phase currents after conversion, and outputs two-phase currents $i\alpha sw$ and $i\beta sw$.

In a similar manner to the first embodiment, an amplitude is extracted from each of the two-phase currents outputted from the three-phase/two-phase converters 24, 25, and 26 by using the Fourier transformer 20, and is squared by the multiplier 21. Then, by using the subtractor 22, the square of the amplitude of each $\alpha$ current is subtracted from the square of the amplitude of each $\beta$ current, whereby differences $\Delta I\alpha\beta u$, $\Delta I\alpha\beta v$, and $\Delta I\alpha\beta w$ are obtained. In this case, the respective differences $\Delta I\alpha\beta u$, $\Delta I\alpha\beta v$, and $\Delta i\alpha\beta w$ are expressed as Formula (12) below.

[Formula 12]

$$\Delta I\alpha\beta u = \frac{4V\alpha\beta h^2 Ll}{(L^2-l^2)^2 \omega h^2}\cos 2\theta$$

$$\Delta I\alpha\beta v = \frac{4V\alpha\beta h^2 Ll}{(L^2-l^2)^2 \omega h^2}\cos(2\theta+2/3\pi)$$

$$\Delta I\alpha\beta w = \frac{4V\alpha\beta h^2 Ll}{(L^2-l^2)^2 \omega h^2}\cos(2\theta-2/3\pi)$$

(12)

where,
stator U-phase direction satisfies $\theta = 0$

Figure 9:
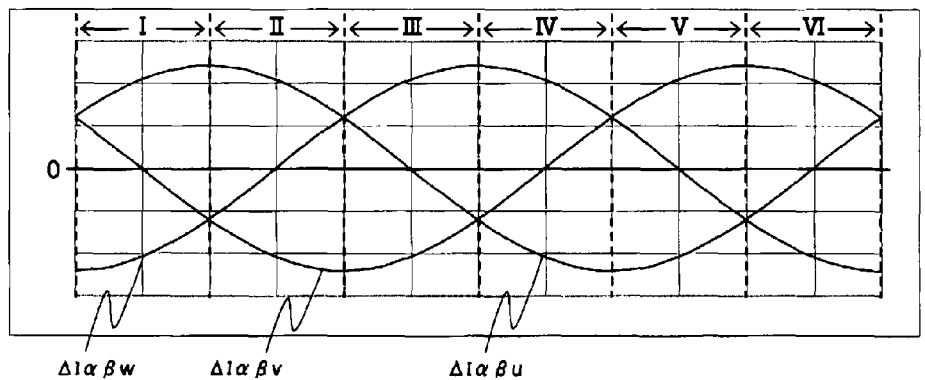
FIG. 9 is an explanatory diagram illustrating an operation of the position estimation means shown in FIG. 8.

According to the magnitude relation among $\Delta I\alpha\beta u$, $\Delta I\alpha\beta v$, and $\Delta i\alpha\beta w$, the position calculation unit 27 generates intervals I to VI as shown in FIG. 9. In each interval, one of $\Delta I\alpha\beta u$, $\Delta I\alpha\beta v$, and $\Delta i\alpha\beta w$, which crosses the zero point, is approximated by using linear approximation, and the rotor position $\theta p$ is obtained by using Formula (13) below. $\Delta i\alpha\beta\_uvw$ in Formula (13) is a value, in $\Delta I\alpha\beta u$, $\Delta I\alpha\beta v$, and $\Delta i\alpha\beta w$, which crosses the zero point, and $|\Delta I\alpha\beta\_uvw|$ represents the amplitude of one of the $\Delta I\alpha\beta u$, $\Delta I\alpha\beta v$, and $\Delta i\alpha\beta w$ which crosses the zero point. It is noted that $|\Delta I\alpha\beta\_uvw|$ may be obtained from the square route of the sum of the respective squares of $\Delta I\alpha\beta u$, $\Delta I\alpha\beta v$, and $\Delta i\alpha\beta w$.

[Formula 13]

$$\theta p = \Delta I\alpha\beta\_uvw / |\Delta I\alpha\beta\_uvw| \quad (13)$$

With the above configuration, it is possible to simply obtain the rotor position $\theta p$ without performing the inverse cosine operation or using the table having stored therein a cosine value, which is performed in the first embodiment, and also possible to reduce the computational complexity.

Other configurations, and operations and effects are similar to those of the first embodiment, and thus details thereof will be omitted herein.

Third Embodiment

Figure 10:
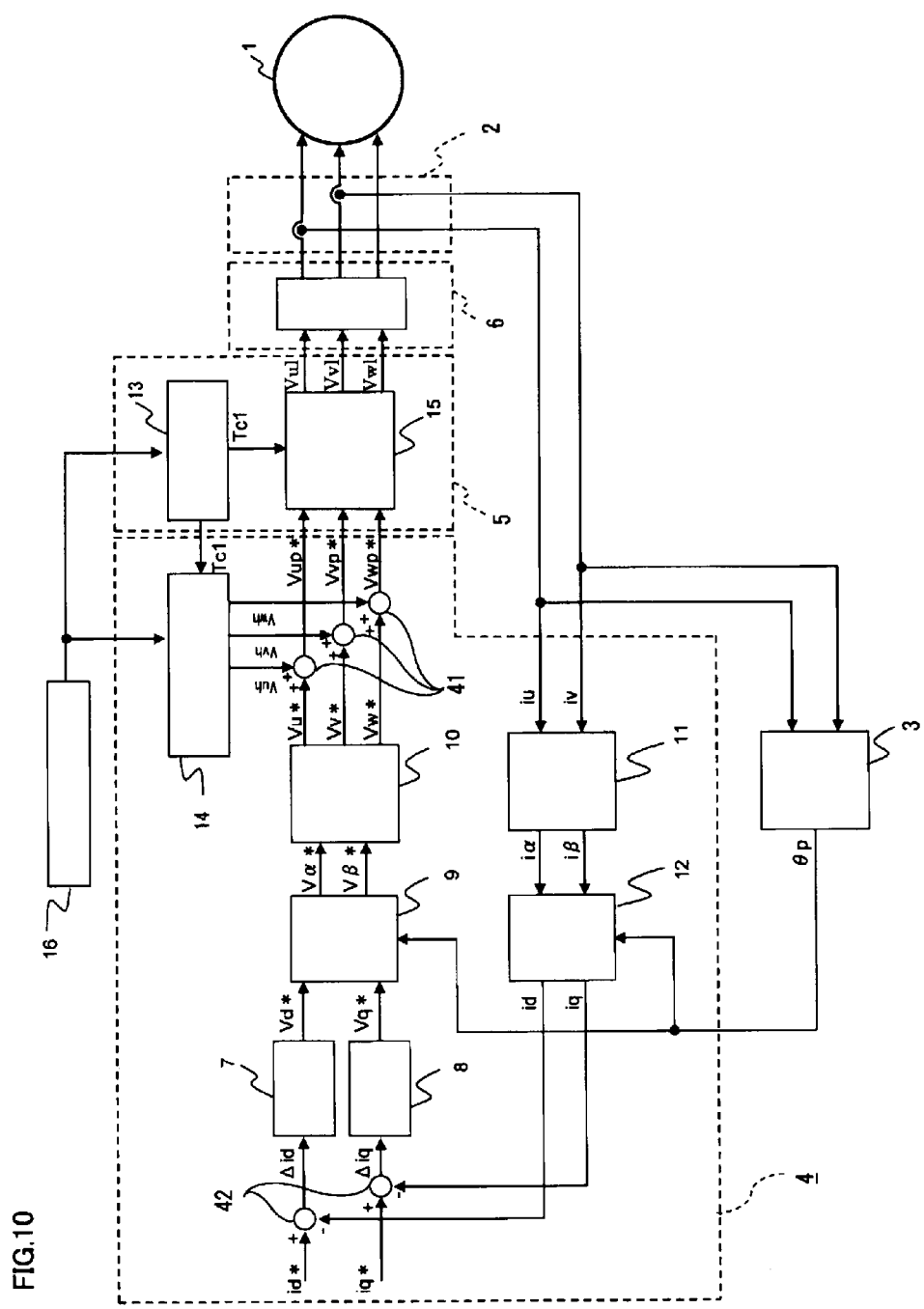
FIG. 10 is a block diagram showing a controller of a rotary electric machine according to a third embodiment of the present invention.

FIG. 10 is a block diagram showing a configuration of a controller of a rotary electric machine according to a third embodiment. Those component parts which correspond to component parts of the first embodiment are provided with identical reference characters.

In the third embodiment, the controller of the rotary electric machine includes rotary electric machine constant input means 16 which inputs a constant of the rotary electric machine 1 (e.g., an inductance value or the like of the rotary electric machine 1). Based on the constant of the rotary electric machine obtained from the rotary electric machine constant input means 16, a position detection voltage generator 14 of a control means 4 determines position detection voltages Vuh, Vvh, and Vwh of three phases which each have a cycle (=m·Tc1) that is equal to m times (m is an integer of three or more) of a switching cycle Tc1 and which are different in phase from one another.

That is, in the third embodiment, the constant of the rotary electric machine is inputted from the rotary electric machine constant input means 16 to a switching cycle generator 13 and to the position detection voltage generator 14. Based on the inputted constant of the rotary electric machine, the switching cycle generator 13 determines an optimal switching cycle Tc1 so as to be outputted to a pulse-width modulation controller 15 and to the position detection voltage generator 14.

On the other hand, based on the inputted constant of the rotary electric machine, the position detection voltage generator 14 determines an optimal multiple m, calculates a product between the switching cycle Tc1 outputted by the switching cycle generator 13 and the multiple m, and outputs the position detection voltages Vuh, Vvh, and Vwh which each have a cycle m·Tc1 and which are different in phase from one another. The position detection voltages Vuh, Vvh, and Vwh are superimposed, by an adder 41, on the fundamental voltages Vu*, Vv*, and Vw*, and as a result, voltage commands Vup*, Vvp*, and Vwp* are supplied to the pulse-width modulation controller 15. In the same manner as the first embodiment, the pulse-width modulation controller 15 uses a pulse-width control method based on the switching cycle Tc1, and outputs logic signals Vul, Vvl, and Vwl to an inverter 6.

The amplitude (magnitude) of the high-frequency currents included in the rotary electric machine currents detected from the rotary electric machine 1 vary depending on the position detection voltages Vuh, Vvh, and Vwh which each have a cycle equal to m times (=m·Tc) of the switching cycle Tc and which are different in phase from one another. Thus, with the characteristics of the rotary electric machine 1 being ignored, when m and Tc are constantly fixed value, there may be a case where the amplitudes (magnitude) of the high-frequency currents generated in the rotary electric machine 1 are decreased due to application of the position detection voltages Vuh, Vvh, and Vwh, and as a result, accuracy of the high-frequency currents detected by the current detection means 2 deteriorates, which leads to deterioration in accuracy in estimation of the rotor position.

On the other hand, in the third embodiment, based on the constant of the rotary electric machine, the constant depending on the type of the rotary electric machine 1, an appropriate value of at least either of the multiple m or the switching cycle Tc is calculated, and the cycle of the position detection voltages Vuh, Vvh, and Vwh which are different in phase from one another is determined such that the cycle is equal to m times of the switching cycle Tc. Therefore, even when the rotary electric machine 1 having a different rotary electric machine constant is driven, the controller is capable of accurately estimating the rotor position of the rotary electric machine 1.

Since other configurations, and operations and effects of the present embodiment are similar to those of the first embodiment, detailed description thereof will be omitted herein.

Fourth Embodiment

Figure 11:
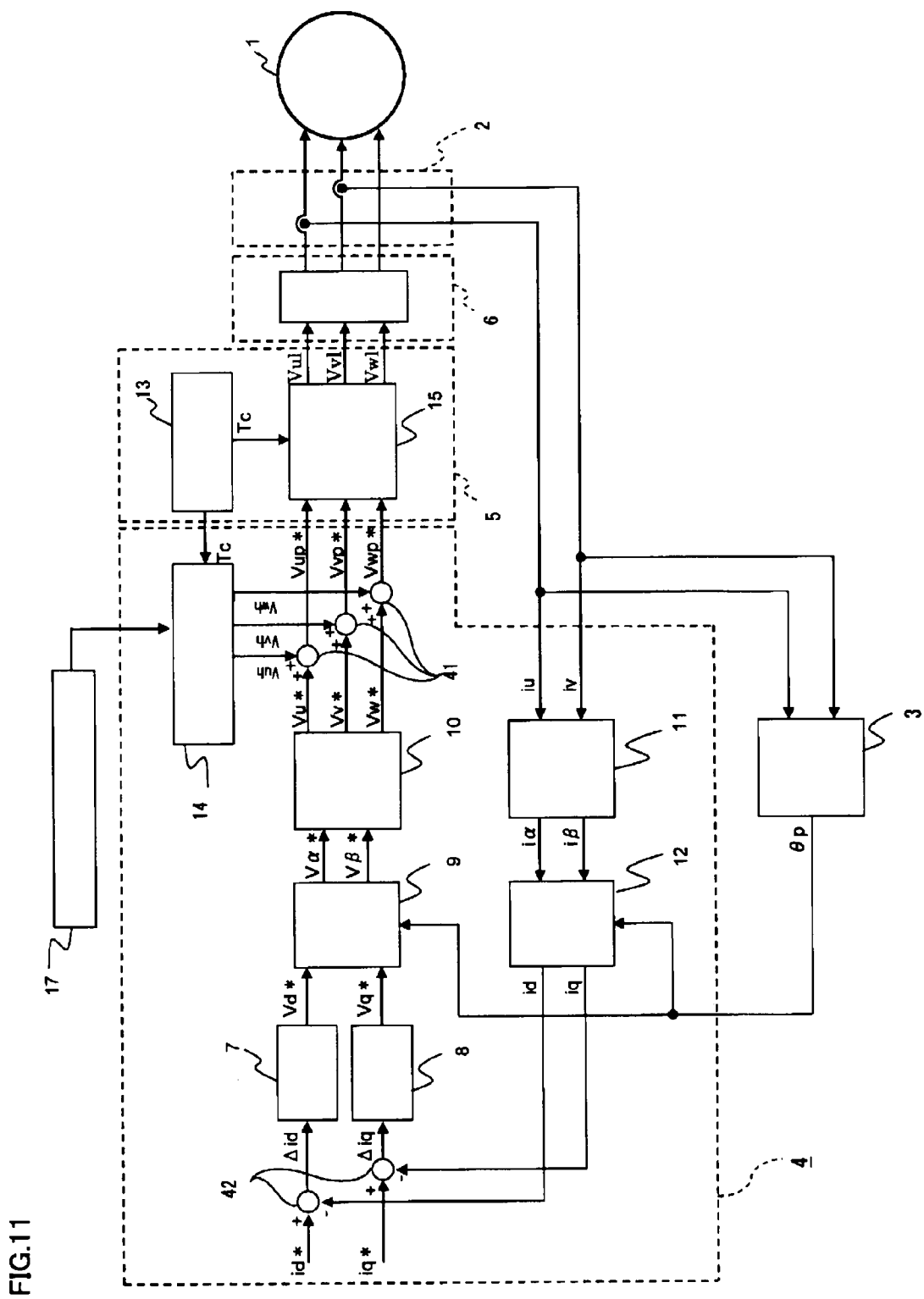
FIG. 11 is a block diagram showing a controller of a rotary electric machine according to a fourth embodiment of the present invention.

FIG. 11 is a block diagram showing a configuration of a controller of a rotary electric machine according to a fourth embodiment. Those component parts which correspond to the component parts of the first embodiment are provided with identical reference characters.

In the fourth embodiment, the controller of the rotary electric machine includes position detection voltage cycle input means 17. In the position detection voltage cycle input means 17, a cycle or a frequency of position detection voltages Vuh, Vvh, and Vwh outputted by the position detection voltage generator 14 is set and inputted so as to change either of the cycle or the frequency. Accordingly, in the position detection voltage generator 14, a multiple m (m is an integer of three or more) of a switching cycle Tc set by the switching cycle generator 13 is determined.

Namely, in the fourth embodiment, the position detection voltage cycle input means 17 determines either of the cycle or the frequency of the position detection voltages Vuh, Vvh, and Vwh outputted by the position detection voltage generator 14. For example, when a user inputs an arbitrary cycle to the position detection voltage cycle input means 17, the position detection voltage generator 14 determines, based on the cycle obtained from the position detection voltage cycle input means 17, the multiple m (m is an integer of three or more) by which the switching cycle Tc is multiplied to set the cycle of the position detection voltages Vuh, Vvh, and Vwh. Further, when a user inputs an arbitrary frequency to the position detection voltage cycle input means 17, the position detection voltage generator 14 calculates a reciprocal of the frequency obtained from the position detection voltage cycle input means 17 so as to obtain the cycle of the position detection voltages, and determines, based on the obtained cycle, the multiple m (m is an integer of three or more) by which the switching cycle Tc is multiplied to set the cycle of the position detection voltages Vuh, Vvh, and Vwh.

In this manner, in the fourth embodiment, with arrangement of the position detection voltage cycle input means 17, the cycle or the frequency of the respective position detection voltages Vuh, Vvh, and Vwh applied to the rotary electric machine 1 can be changed arbitrarily, and thus, it is possible to change a frequency of a noise being generated, thereby reducing a discomfortable feeling caused by the noise.

Since other configurations, and operations and effects of the present embodiment are similar to those of the first embodiment, detailed description thereof will be omitted herein.

Fifth Embodiment

In the first embodiment, the position detection voltage generator 14 outputs the position detection voltages Vuh, Vvh, and Vwh, which each have a cycle equal to m times of the switching cycle Tc outputted by the switching cycle generator 13 and which are different in phase from one another, where m is set as an integer of three or more. However, the value of m is not specified.

In the fifth embodiment, the value of m is limited to 6n (n is a natural number). Namely, a cycle Thv of the position detection voltages Vuh, Vvh, and Vwh is limited to 6n times (n is a natural number) of the switching cycle Tc. Accordingly, the phase difference among the position detection voltages Vuh, Vvh, and Vwh is 120°, and the position detection voltages Vuh, Vvh, and Vwh can be set as balanced three-phase voltage commands.

Figure 12:
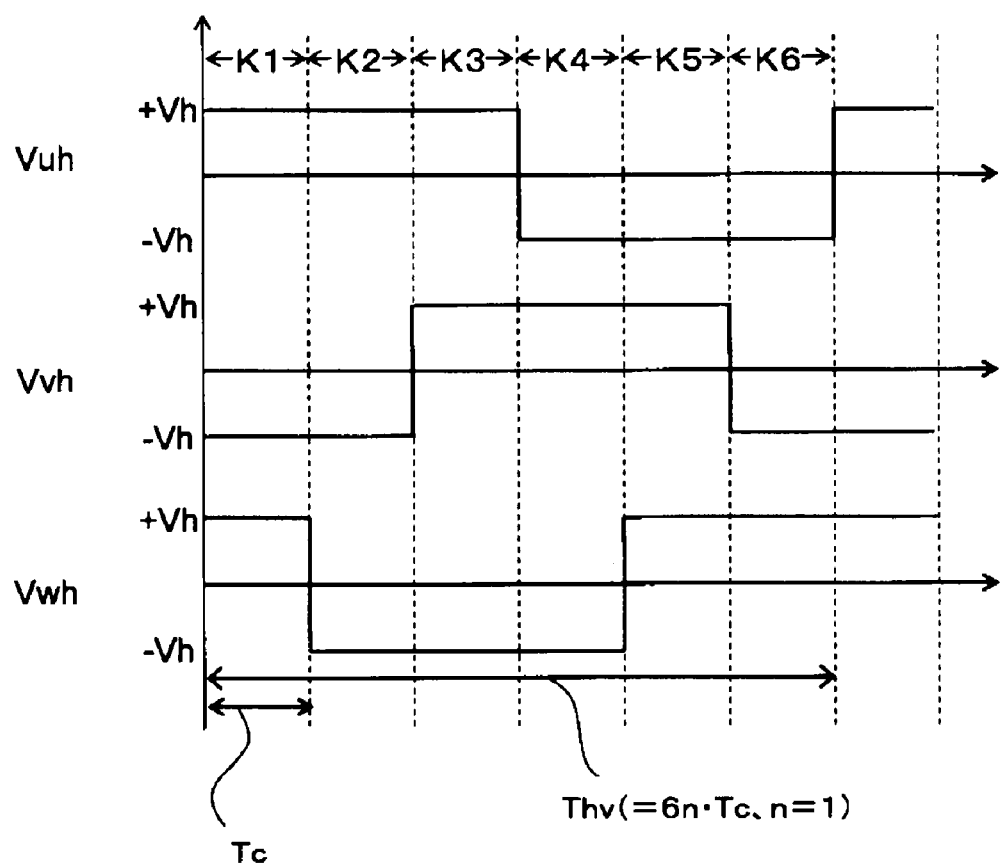
FIG. 12 is an explanatory diagram illustrating an operation of a controller according to a fifth embodiment of the present invention.

As an example, voltage waveforms in the case of n=1 are shown in FIG. 12, where the switching cycle Tc and the position detection voltage cycle Thv are used. In FIG. 12, +Vh and −Vh, each having an arbitrary value, are outputted alternately at every three intervals, and the phase difference among the position detection voltages Vuh, Vvh, and Vwh is two intervals. In this case, since the cycle Thv of the position detection voltages has six intervals, the phase difference between two intervals is 360°/6 intervals×2 intervals=120°, and consequently, the position detection voltages Vuh, Vvh, and Vwh become balanced three-phase AC voltages. Therefore, it is possible to minimize the effect of application of unbalanced three-phase AC voltages to the rotary electric machine 1. In addition, compared to a case where the unbalanced three-phase AC voltages are applied, it is possible to simplify calculation, such as Fourier transformation or the like, required for position estimation.

Since other configurations, and operations and effects of the present embodiment are similar to those of the first embodiment, detailed description thereof will be omitted herein.

Sixth Embodiment

Figure 13:
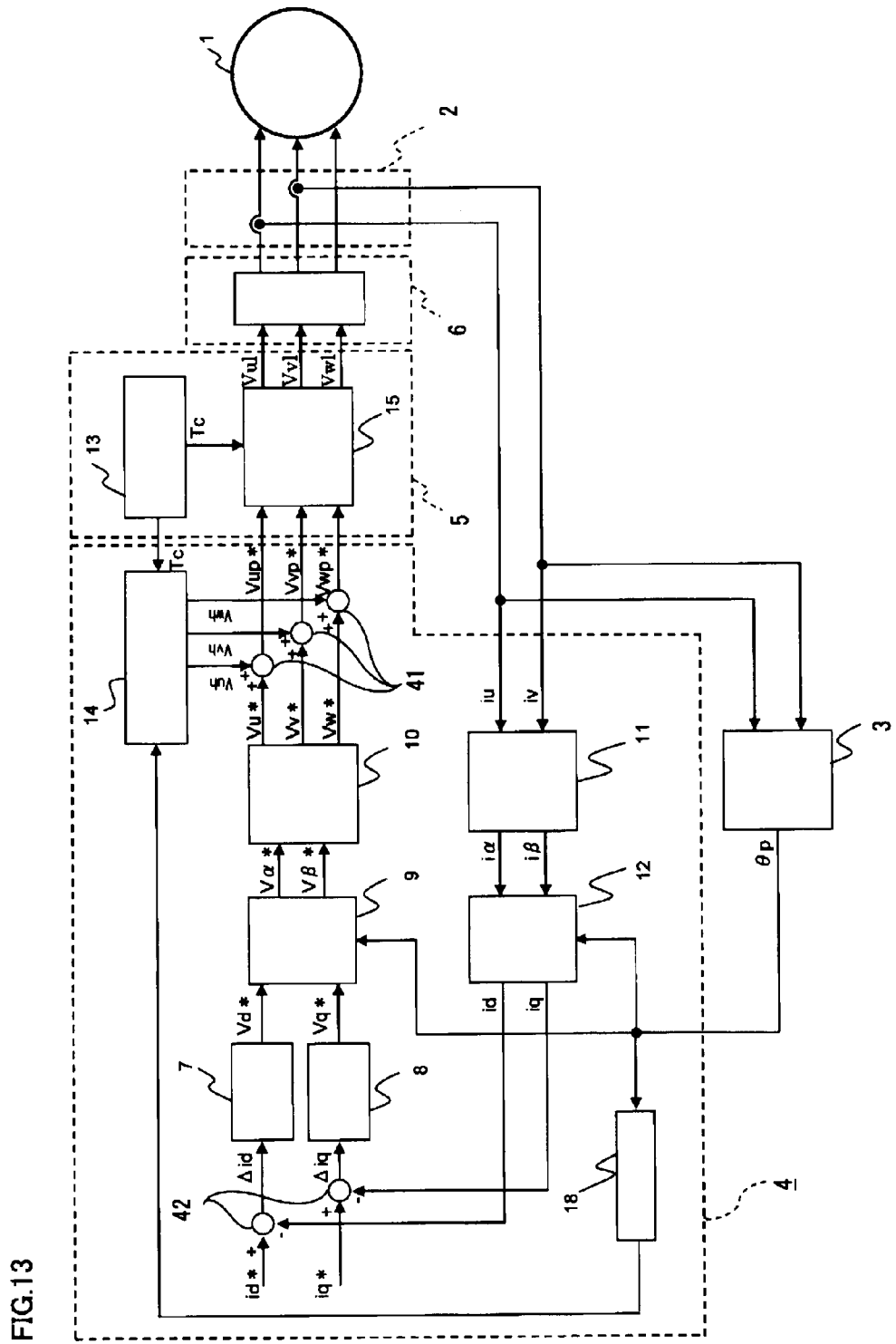
FIG. 13 is a block diagram showing a controller of a rotary electric machine according to a sixth embodiment of the present invention.

FIG. 13 is a block diagram showing a configuration of a controller of a rotary electric machine according to a sixth embodiment. Those component parts which correspond to the component parts of the first embodiment are provided with identical reference characters.

In the sixth embodiment, a control means 4 has a speed calculation unit 18 for calculating, based on a rotor position θp outputted by position calculation means 3, a rotation speed of a rotary electric machine 1. Information of the rotation speed calculated by the speed calculation unit 18 is provided to the position detection voltage generator 14.

When the rotation speed of the rotary electric machine 1 is relatively high, it is possible to easily estimate the rotor position of the rotary electric machine 1 by using an induced voltage of the rotary electric machine 1, not by superimposing position detection voltages Vuh, Vvh, and Vwh on fundamental voltages Vu*, Vv*, and Vw*. In the sixth embodiment, when the rotation speed of the rotary electric machine 1 outputted by the speed calculation unit 18 reaches a predetermined speed or more, the position detection voltage generator 14 sets the position detection voltages Vuh, Vvh, and Vwh to zero, so that the position detection voltages do not affect the fundamental voltages Vu*, Vv*, and Vw*. In addition, the estimation method is switched to a method in which the rotor position of the rotary electric machine is estimated based on the induced voltage of the rotary electric machine 1.

By using the above configuration, it is possible to eliminate extra energy loss which is caused by applying, to the rotary electric machine 1, high-frequency voltages including the position detection voltages Vuh, Vvh, and Vwh which each have a cycle equal to m times of the switching cycle and which are different in phase from one another.

Since other configurations, and operations and effects of the present embodiment are similar to those of the first embodiment, detailed description thereof will be omitted herein.

Seventh Embodiment

First, prior to description of a controller of a rotary electric machine according to a seventh embodiment of the present invention, a conventional technique will be described, in which, as described in BACKGROUND ART, for the sake of reduction in costs of a current sensor, a DC bus current which flows between the DC voltage source supplying a DC voltage to an inverter and the inverter is detected using a current sensor, and then the phase, of the rotary electric machine 1, in which the current is currently flowing is obtained by calculation based on the difference in switching timing among switches of the respective phases of the inverter at the time of detecting the DC bus current.

Figure 14:
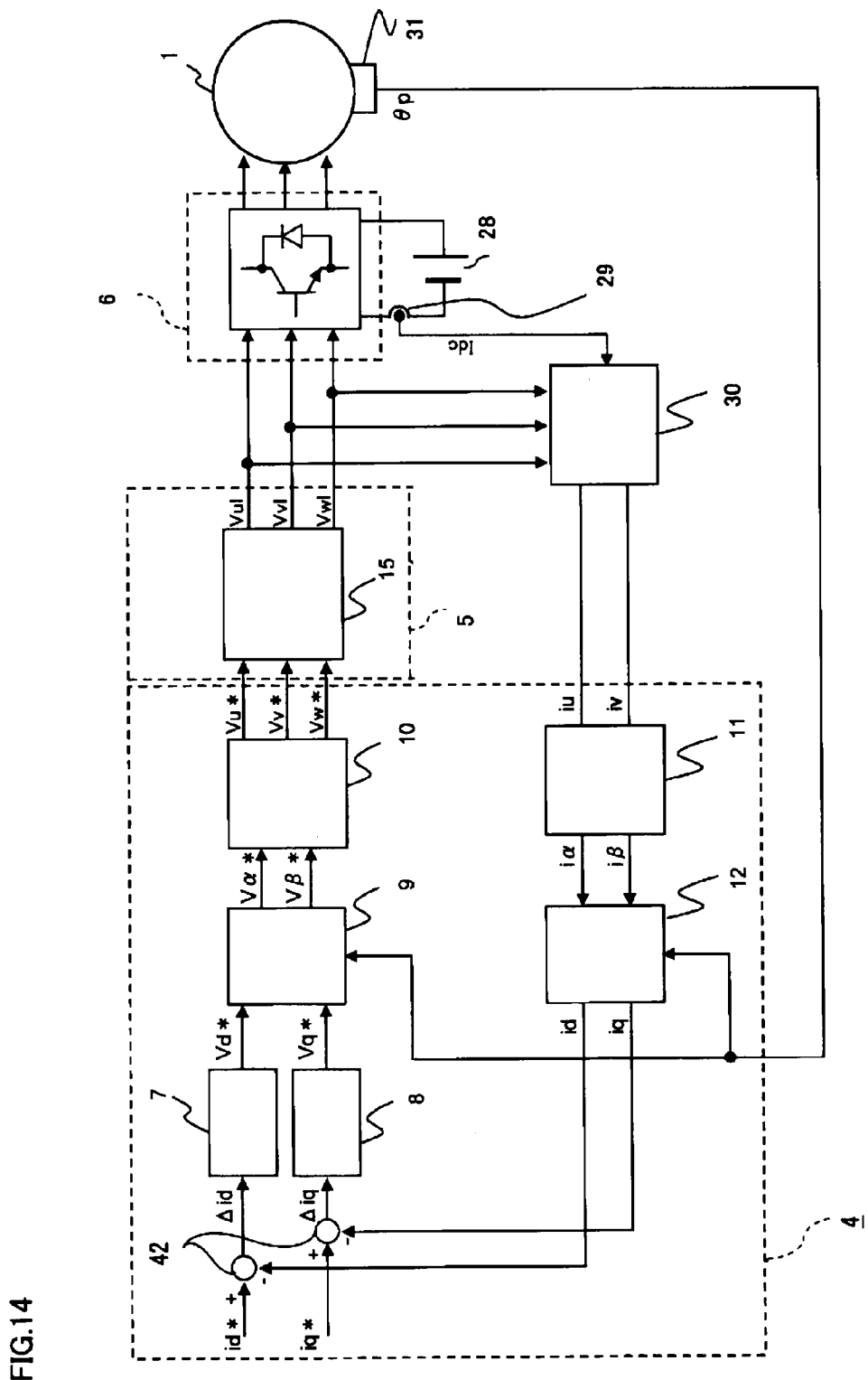
FIG. 14 is a block diagram showing a controller of a conventional rotary electric machine, the controller calculating rotary electric machine currents from a DC bus current.

FIG. 14 is a block diagram showing a controller of a conventional rotary electric machine including a rotary electric machine current calculation means 30 which calculates a rotary electric machine current from a DC bus current Idc which is detected by a single piece of bus current detection means (current sensor) 29. It is noted that, in FIG. 14, the rotary electric machine 1 is not provided with position estimation means but is provided with a rotor position sensor 31 for detecting a rotating position of the machine. However, since such a configuration is not directly related to calculation of the rotary electric machine currents performed by the rotary electric machine current calculation means 30, description thereof will be omitted.

The controller of the rotary electric machine shown in FIG. 14 includes the bus current detection means 29, which is a single current sensor, for detecting a DC bus current Idc flowing between a DC voltage source 28 and an inverter 6, and also includes the rotary electric machine current calculation means 30 for calculating rotary electric machine currents iu and iv which flow to the rotary electric machine 1 in accordance with the DC bus current Idc detected by the bus current detection means 29 and with logic signals Vul, Vvl, and Vwl outputted from a pulse-width modulation means 5.

Figure 15:
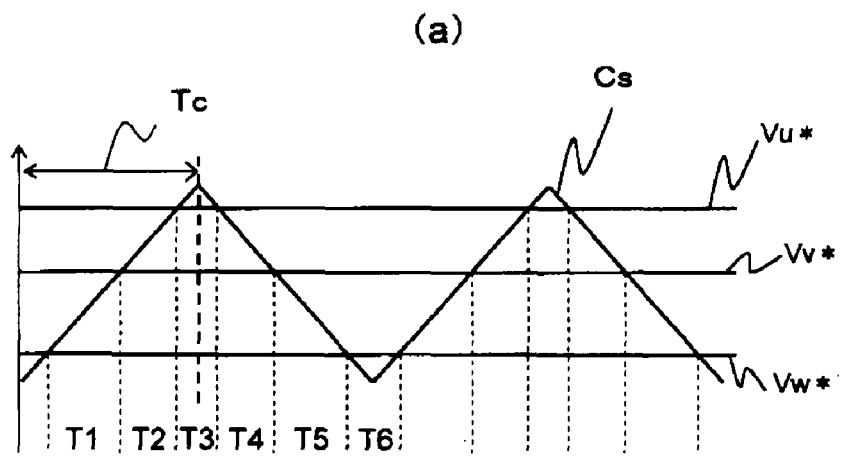
FIG. 15 is an explanatory diagram illustrating an operation of the controller of the rotary electric machine having a configuration shown in FIG. 14.

FIG. 15 shows temporal changes (FIG. 15(*a*)) of fundamental voltages Vu*, Vv*, and Vw* outputted from a two-phase/three-phase converter 10 and a triangle wave Cs in the case where a pulse-width modulation control method using the triangle wave Cs is used, and also shows temporal changes (FIG. 15(*b*)) of logic signals Vul, Vvl, and Vwl outputted from the pulse-width modulation controller 15. The pulse-width modulation controller 15 outputs "Hi" logic signals Vul, Vvl, and Vwl when the respective fundamental voltages Vu*, Vv*, and Vw* are greater than the triangle wave Cs, and on the other hand, outputs "Low" logic signals Vul, Vvl, and Vwl when the fundamental voltages are lower than the triangle wave Cs.

Figure 16:
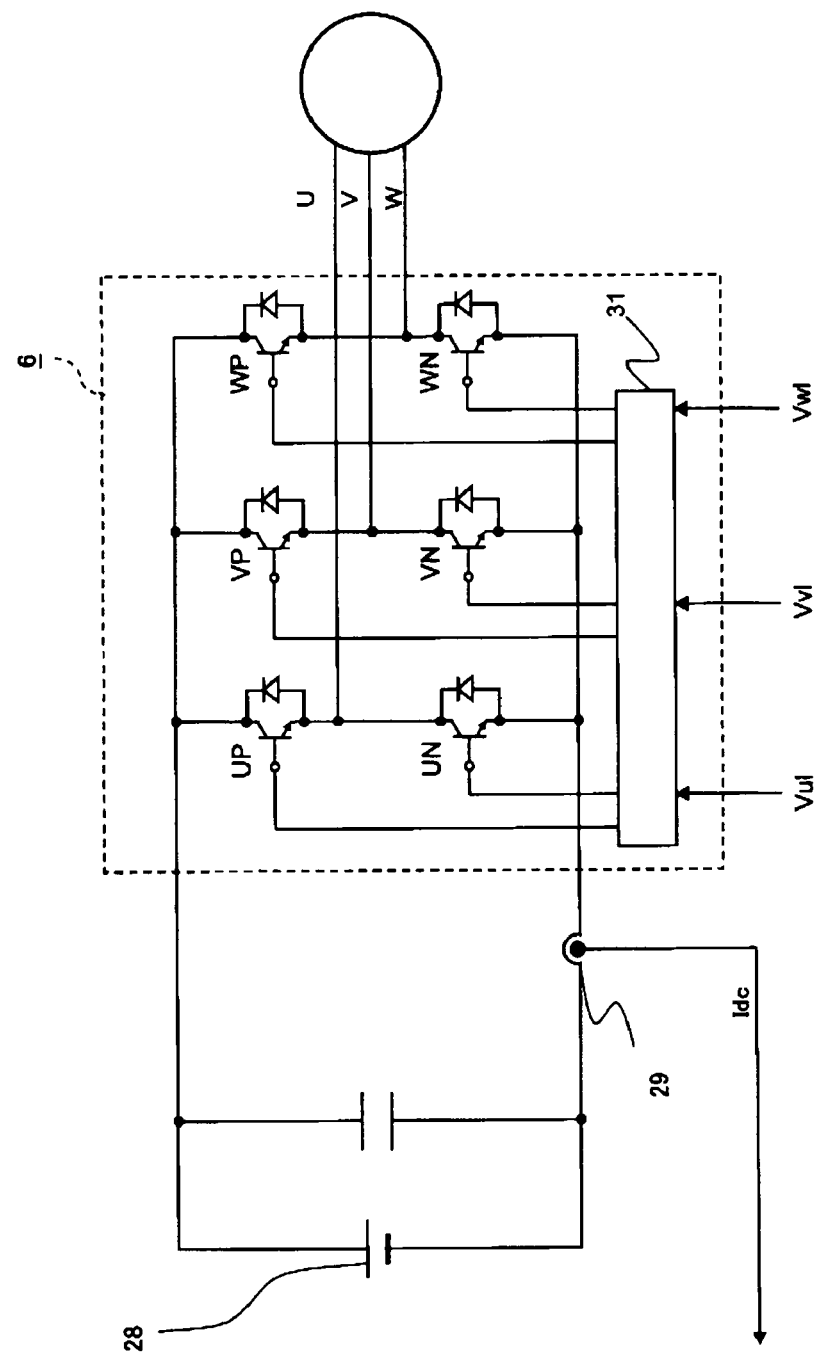
FIG. 16 is a block diagram showing voltage application means of the controller of the rotary electric machine shown in FIG. 14.

FIG. 16 is a block diagram showing the state of connection between the DC voltage source 28 and the bus current detection means 29, and connection between the DC voltage source 28 and the inverter 6.

Switches UP, VP, WP, UN, VN, WN of the inverter 6 is turned ON/OFF by a gate drive circuit 31 in accordance with logic signals Vul, Vvl, and Vwl which are outputted from the pulse-width modulation means 5. For example, the switch UP is turned ON and OFF when the logic signal Vul is "Hi" and "Low", respectively. The switch UN is turned ON and OFF when the logic signal Vul is "Low" and "Hi", respectively. The switch VP is turned ON and OFF when the logic signal Vvl is "Hi" and "Low", respectively. The switch VN is turned ON and OFF when the logic signal Vvl is "Low" and "Hi", respectively. The switch WP is turned ON and OFF when the logic signal Vwl is "Hi" and "Low", respectively. The switch WN is turned ON and OFF when the logic signal Vwl is "Low" and "Hi", respectively.

Next, an operating principle of calculation of the rotary electric machine currents by using the DC bus current Idc will be described.

When the logic signals are outputted as shown in FIG. 15(*b*), in an interval T1, the switches UP, VP, and WN are turned ON, and the remaining switches are turned OFF. Thus, at the switching timing in the interval T1, a current iw flowing in a W-phase of the rotary electric machine 1 is identical to the current Idc detected by the bus current detection means 29. Next, in an interval T2, the switches UP, VN, and WN are turned ON, and the remaining switches are turned OFF. Thus, during the switching timing of interval T2, a current iu flowing in a U-phase of the rotary electric machine 1 is identical to the current Idc detected by the bus current detection means 29. That is, in the interval T1, the rotary electric machine current iw of the W-phase can be obtained, and in the interval T2, the rotary electric machine current iu of the U-phase can be obtained. A rotary electric machine current iv of the remaining V-phase can be obtained using Formula (14) below since the sum of the three-phase currents is zero. In this manner, the bus current detection means 29 is capable of detecting the rotary electric machine currents iu, iv, and iw of three phases during a half cycle (switching cycle Tc) of the triangle wave Cs.

[Formula 14]

$$iv = -(iu+iw) \quad (14)$$

In this manner, based on the difference in the switching timing among the logic signals Vul, Vvl, and Vwl, which are outputted from the pulse-width modulation means 5, and on the DC bus current Idc detected by the bus current detection means 29, the rotary electric machine current detection means 30 identifies the phase, of the rotary electric machine 1, in which a current corresponding to the detected DC bus current Idc is flowing, and calculates the rotary electric machine current of each phase.

For detecting three-phase currents, it is essentially preferable to detect rotary electric machine currents of three phases at the same timing. However, since the difference in the switching timing among the logic signals Vul, Vvl, and Vwl is utilized, it is impossible to detect the rotary electric machine currents of three phases at the same timing. Specifically, the rotary electric machine currents of the W-phase and the U-phase are detected in the switch interval T1 and T2, respectively, and the rotary electric machine current of the V-phase is obtained by using Formula (14). Thus, a time difference occurs after the rotary electric machine current of the W-phase is detected in the switch interval T1 until the rotary electric machine current of the U-phase is detected in the switch interval T2. Therefore, there may be a case where values of the rotary electric machine currents of three phases change during the time difference, resulting in an occurrence of a detection error. However, the switch interval T1 and the switch interval T2 are adjacent to each other, and in most cases the time difference is minute. Therefore, it is possible to actually ignore the detection error caused by the change in the currents during the time difference.

Figure 17:
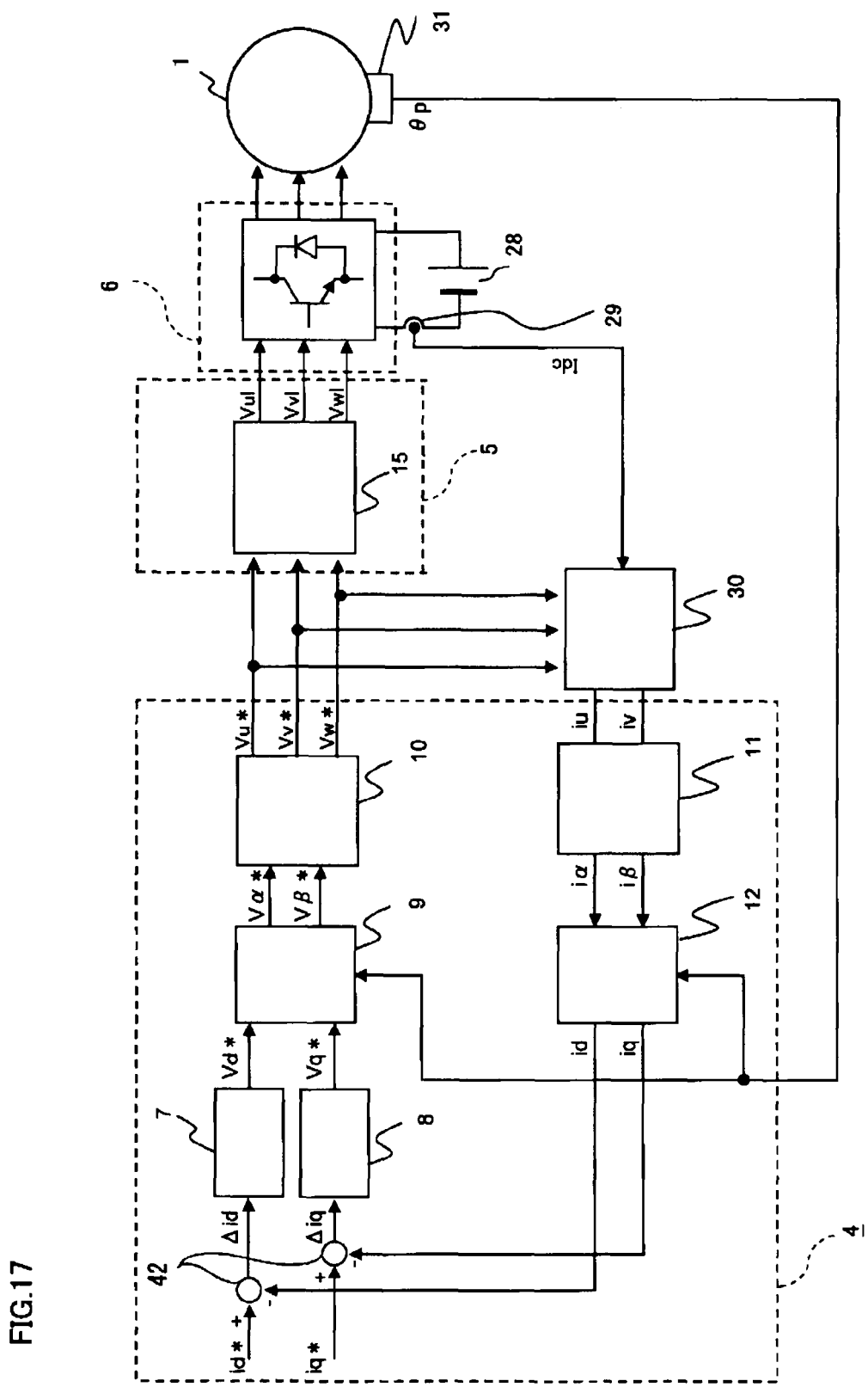
FIG. 17 is a block diagram showing a controller of another conventional rotary electric machine, the controller calculating rotary electric machine currents from a DC bus current.

In the configuration shown in FIG. 14, the rotary electric machine current calculation means 30 calculates the rotary electric machine currents iu and iv flowing to the rotary electric machine 1, in accordance with the DC bus current Idc detected by the bus current detection means 29 and with the logic signals Vul, Vvl, and Vwl outputted from the pulse-width modulation means 5. However, as shown in FIG. 17, the rotary electric machine current calculation means 30 may calculate the rotary electric machine currents flowing to the rotary electric machine 1, in accordance with the DC bus current Idc detected by the bus current detection means 29 and the fundamental voltages Vu*, Vv*, and Vw* outputted from the two-phase/three-phase converter 10. That is, in the configuration shown in FIG. 14, signals inputted to the rotary electric machine current calculation means 30 are the DC bus current Idc, and the logic signals Vul, Vvl, and Vwl which are outputted from the pulse-width modulation means 5, whereas in the configuration shown in FIG. 17, signals inputted to the rotary electric machine current calculation means 30 are the DC bus current Idc and the fundamental voltages Vu*, Vv*, and Vw*.

Based on the configuration shown in FIG. 17, an operating principle of the rotary electric machine current calculation means 30, which calculates the rotary electric machine currents in accordance with the DC bus current Idc, will be described with reference to FIG. 18.

Figure 18:
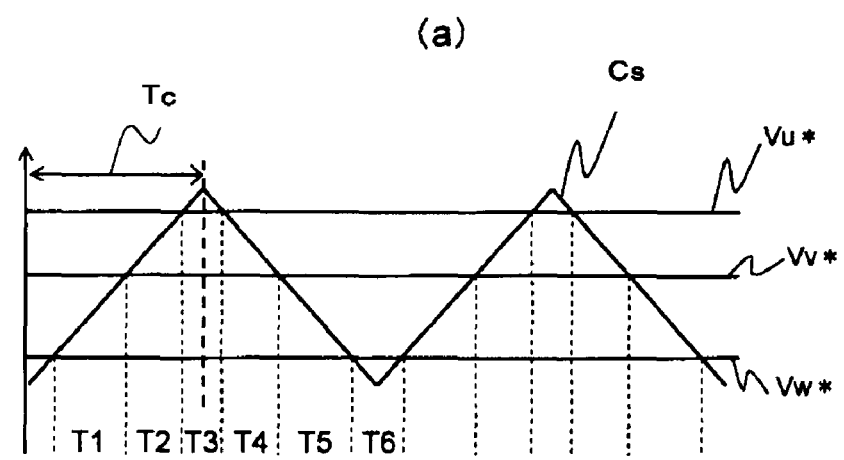
FIG. 18 is an explanatory diagram illustrating an operation of the controller of the rotary electric machine having a configuration shown in FIG. 17.

FIG. 18 shows, similarly to FIG. 15, temporal changes of the fundamental voltages Vu*, Vv*, and Vw* outputted from a two-phase/three-phase converter 10 and the triangle wave Cs in the case where a pulse-width modulation control method using the triangle wave Cs is used (FIG. 18(*a*)), and also shows which phase of rotary electric machine current is obtained from the DC bus current Idc detected by the bus current detection means 29, in accordance with temporal changes of the logic signals and the difference among the logic signals (FIG. 18(*b*)).

Among the fundamental voltages Vu*, Vv*, and Vw*, as shown in FIG. 18(*a*), one which is the greatest in value is referred to as a maximum phase (Vu* in FIG. 18(*a*)), one which is the lowest in value is referred to as a minimum phase (Vw* in FIG. 18(*a*)), and one which is between the greatest one and the lowest one is referred to as an intermediate phase (Vv* in FIG. 18(*a*)). In the case where the pulse-width modulation control method using the triangle wave Cs is used, when the rotary electric machine currents are calculated based on the DC bus current Idc, the phase rotary electric machine currents of the maximum phase and the minimum phase can be obtained during a half cycle of the triangle wave Cs (switching cycle Tc). In addition, the currents are detected before and after the intermediate phase overlaps with the triangle wave Cs (see FIG. 18(*b*)).

When the triangle wave Cs is a positive slope, the rotary electric machine current of the minimum phase can be obtained before the intermediate phase overlaps with the triangle wave Cs (in FIG. 18, the W-phase can be detected in the interval T1), whereas the rotary electric machine current of the maximum phase can be obtained after the intermediate phase overlaps with the triangle wave Cs (in FIG. 18, the U-phase can be detected in the interval T2). When the triangle wave Cs is a negative slope, the rotary electric machine current of the maximum phase can be obtained before the intermediate phase overlaps with the triangle wave Cs (in FIG. 18, the U-phase can be detected in the interval T4), whereas the rotary electric machine current of the minimum phase can be obtained after the intermediate phase overlaps with the triangle wave Cs, (in FIG. 18, the W-phase can be detected in the interval T5). The fundamental voltages Vu*, Vv*, and Vw* and the rotary electric machine currents which are obtained based on the DC bus current Idc have the above described relation, and thus, by using the DC bus current Idc detected by the DC bus current 29 and the fundamental voltages Vu*, Vv*, and Vw*, it is possible to obtain the rotary electric machine currents from the DC bus current Idc.

In this manner, as shown in FIG. 14 to FIG. 18, in the case where the phase, of the rotary electric machine 1, in which a current is flowing currently is calculated by utilizing the DC bus current Idc and the difference in the switching timing among the switches of the respective phases of the inverter at the time of detecting the DC bus current Idc, only a single current sensor is required to detect the DC bus current Idc, unlike the cases described in the first to sixth embodiments, where a plurality of current sensors is required to directly detect the rotary electric machine currents of at least two phases. Therefore, advantageously, it is possible to reduce costs of the current sensor.

Figure 19:
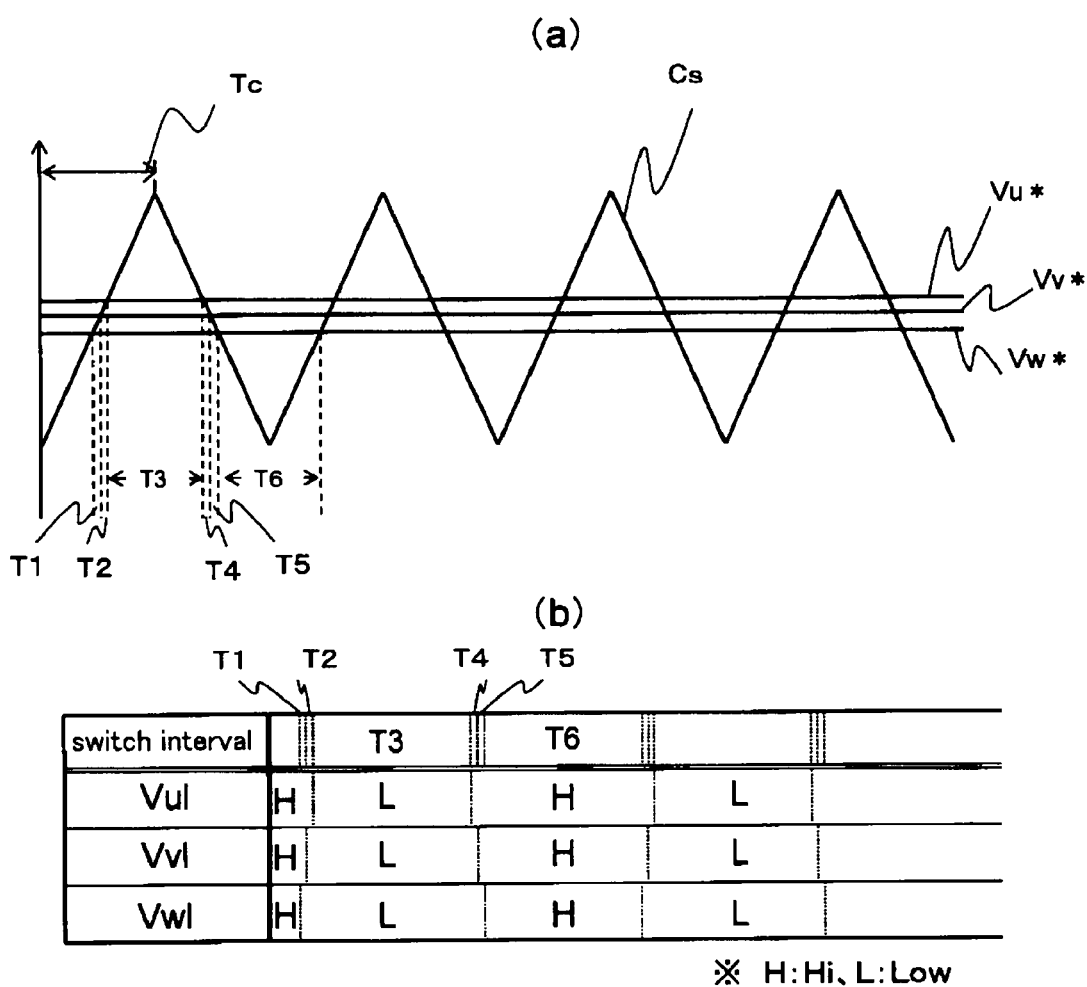
FIG. 19 is an explanatory diagram illustrating an operation in the controller of the rotary electric machine having the configuration shown in FIG. 14 or FIG. 17, in the case where a problem occurs in calculation of the rotary electric machine currents based on the DC bus current.

However, as described above, the method of calculating the rotary electric machine currents, based on the DC bus current Idc, utilizes the difference in the switching timing among the switches of the respective phases of the inverter at the time of detecting the DC bus current Idc. Thus, as shown in FIG. 19(*a*), for example, when values of the fundamental voltages Vu*, Vv*, and Vw* are close or identical to one another, the switching timings of the respective phases become close or identical to one another. As a result, in the case of the configuration shown in FIG. 14 or FIG. 17, a period of each switch interval such as T1, T2, and the like becomes extremely short or disappears, as shown in FIG. 19(*b*). Thus, it becomes extremely difficult to determine the phase, of the rotary electric machine 1, in which a current identical to the current detected by the bus current detection means 29 is flowing. Therefore, in order to determine the phase in which the current identical to the DC bus current Idc is flowing, a predetermined value or more of time needs to be secured as the switch interval.

It is noted that the controller described in each of the first to the sixth embodiments detects rotary electric machine currents of at least two phases directly by using a current sensor or the like, and does not utilize the difference in the switching timing among the respective phases. Therefore, even if values of the fundamental voltages Vu*, Vv*, and Vw* are close or identical to one another, it is possible to detect the rotary electric machine currents of the respective phases of the rotary electric machine 1 in a secured manner, and the above problem does not occur.

When the rotary electric machine currents are calculated based on the DC bus current Idc, in order to achieve determination of the phase in which a current identical to the DC bus current Idc is flowing, even when the fundamental voltages Vu*, Vv*, and Vw* are close or identical to one another as shown in FIG. 19(*a*), the position detection voltages Vuh, Vvh, and Vwh are superimposed on the fundamental voltages Vu*, Vv*, and Vw* outputted from the two-phase/three-phase converter 10, whereby the above problem can be solved. Hereinafter, the seventh embodiment of the present invention will be described in which the rotary electric machine currents are calculated based on the DC bus current Idc by utilizing the position detection voltages Vuh, Vvh, and Vwh.

Figure 20:
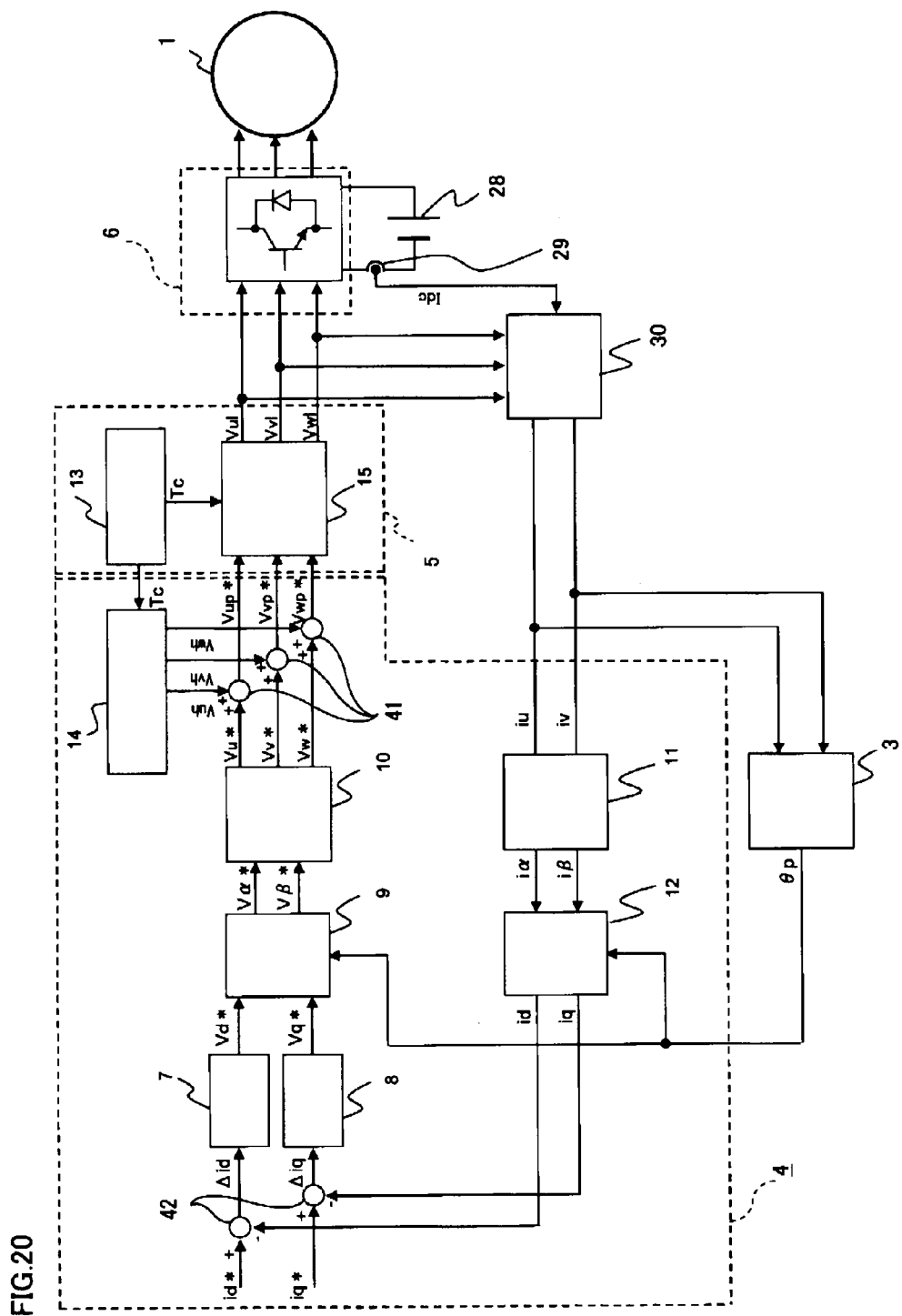
FIG. 20 is a block diagram showing a controller of a rotary electric machine according to a seventh embodiment of the present invention.

FIG. 20 is a block diagram showing a controller of a rotary electric machine according to the seventh embodiment. Those component parts which correspond to the component parts of the first embodiment are provided with identical reference characters.

The controller of the rotary electric machine according to the seventh embodiment is based on the configuration of the first embodiment shown in FIG. 1, and the current detection means 2 shown in FIG. 1 is omitted. Instead of that, the controller includes bus current detection means 29 for detecting the bus current Idc which flows between an inverter 6 and a DC voltage source 28 supplying DC power to the inverter 6, and rotary electric machine current calculation means 30 for calculating rotary electric machine currents in accordance with the bus current Idc detected by the bus current detection means 29 and with logic signals Vul, Vvl, and Vwl outputted from pulse-width modulation means 5. It is noted that even when a configuration in which the logic signals Vul, Vvl, and Vwl outputted from the pulse-width modulation means 5 are inputted to the rotary electric machine current calculation means 30 is replaced with a configuration in which the fundamental voltages Vu*, Vv*, and Vw* outputted from a two-phase/three-phase converter 10 are inputted to the rotary electric machine current calculation means 30, in the same manner as the case shown in FIG. 17, a similar effect can be exerted.

Here, in the case where the fundamental voltages Vu*, Vv*, and Vw* outputted from the two-phase/three-phase converter 10 are close to one another as shown in FIG. 19(a), then when the position detection voltages Vuh, Vvh, and Vwh having waveforms (cycle Thv=6n·Tc, n=1) shown in FIG. 12 described in the fifth embodiment, for example, are superimposed by using an adder 41 of control means 4 shown in FIG. 20, the voltage commands Vup*, Vvp*, and Vwp*, which are resultant outputs, have waveforms shown in FIG. 21(a). It is noted that average values of the voltage commands Vup*, Vvp*, and Vwp* are identical to the fundamental voltages Vu*, Vv*, and Vw* shown in FIG. 19(a), respectively. Thus, when the frequencies of the position detection voltages Vuh, Vvh, and Vwh are set at a certain level or higher that does not affect control of the rotary electric machine 1, it is possible to control the rotary electric machine 1 in the same manner as the case where the position detection voltages Vuh, Vvh, and Vwh are not superimposed.

In the case where the voltage commands Vup*, Vvp*, and Vwp* outputted from the control means 4 have waveforms shown in FIG. 21(a), logic signals Vul, Vvl, and Vwl outputted accordingly from the pulse-width modulation controller 15 are as shown in FIG. 21(b). That is, the periods of the switch intervals T1 and T4, which are short in FIG. 19(b), are extended in FIG. 21(b). Since the switch intervals T1 and T4 are extended, in the switch interval T1, it is possible to detect the rotary electric machine current iv of the V-phase, and in the switch interval T4, it is possible to detect the rotary electric machine current iu of the U-phase. The rotary electric machine current iw of the remaining W-phase can be calculated using the above-described Formula (14). In other words, by superimposing the position detection voltages Vuh, Vvh, and Vwh, it becomes possible to detect rotary electric machine currents of three phases during one cycle (two times of the switching cycle Tc) of the triangle wave Cs. It is noted, however, that since switch intervals T2 and 15 are the same as those in FIG. 19(b), it is impossible to obtain the rotary electric machine currents during the intervals.

A maximum value of the amplitude Vh of the position detection voltages Vuh, Vvh, and Vwh outputted from the position detection voltage generator 14 is a value obtained by subtracting a voltage necessary for driving the rotary electric machine 1 from a maximum voltage outputted by the inverter 6, whereas a minimum value of the amplitude Vh is equal to or greater than an error voltage caused by dead time for preventing a short circuit of a switching element included in the inverter 6. Accordingly, it is possible to exert an effect of calculation of the rotary electric machine currents based on the DC bus current.

As described above, in the seventh embodiment, the position detection voltages Vuh, Vvh, and Vwh which are different in phase from one another are superimposed on the fundamental voltages Vu*, Vv*, and Vw* in advance, and the rotary electric machine currents are calculated based on the DC bus current Idc. Accordingly, only a single piece of bus current detection means such as a current sensor or the like is required, which enhances cost reduction. In addition, even when the values of the fundamental voltages Vu*, Vv*, and Vw* are close or identical to one another, it is possible to calculate and obtain the rotary electric machine currents of three phases.

Eighth Embodiment

As described in the seventh embodiment, when the position detection voltages Vuh, Vvh, and Vwh which are different in phase from one another are superimposed on the fundamental voltages Vu*, Vv*, and Vw* in advance, and then the rotary electric machine currents are calculated, based on the DC bus current Idc, even if the values of the fundamental voltages Vu*, Vv*, and Vw* are close or identical to one another, it is advantageously possible to obtain the respective rotary electric machine currents of three phases.

Figure 21:
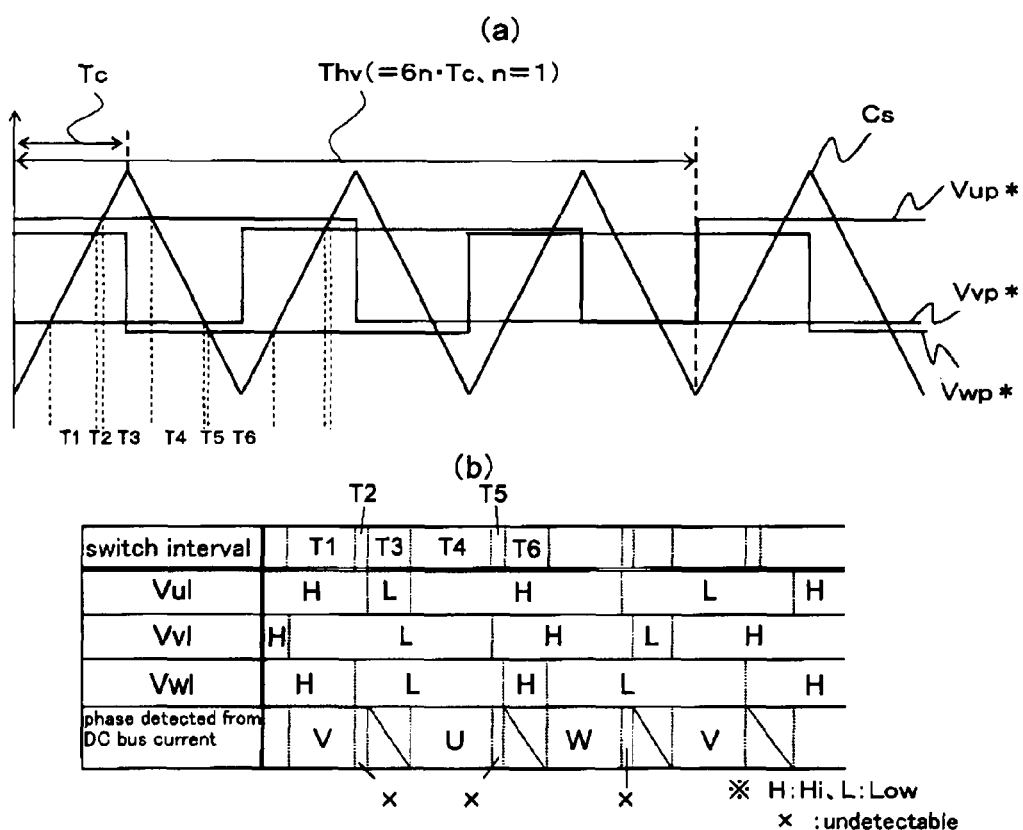
FIG. 21 is an explanatory diagram illustrating an operation of the controller of the rotary electric machine shown in FIG. 20.

However, when the rotary electric machine currents are calculated based on the DC bus current by using the position detection voltages Vuh, Vvh, and Vwh having the waveforms (cycle Thv=6n·Tc, n ~1) shown in FIG. 12, a detection interval of the rotary electric machine currents of three phases is a cycle Tcs of the triangle wave Cs (=2Tc, i.e., two times of the switching cycle Tc) as shown in FIG. 21. On the other hand, in the configuration in FIG. 14 or FIG. 17, when the rotary electric machine currents of three phases are detectable (when the values of the fundamental voltages Vu*, Vv*, and Vw* are not close or identical to one another), the detection interval of the rotary electric machine currents of three phases is a half cycle of the triangle wave Cs (=switching cycle Tc) as shown in FIG. 15(b) or 18(b). That is, when the rotary electric machine currents are calculated based on the DC bus current Idc by using the position detection voltages Vuh, Vvh, and Vwh having the waveforms shown in FIG. 12 as they are, the detection interval of the rotary electric machine currents of three phases becomes two times of the switching cycle Tc.

Further, in the method in which the rotary electric machine currents are calculated based on the DC bus current, by using the position detection voltages Vuh, Vvh, and Vwh having the waveforms shown in FIG. 12, the rotary electric machine currents of the V-phase and the U-phase are detected in the switch interval T1 and in the switch interval T4, respectively, as shown in FIG. 21(b). In addition, the rotary electric machine current of the W-phase is obtained based on Formula (14). Thus, a time difference occurs after the rotary electric machine current of the V-phase is detected in the switch interval T1 until the rotary electric machine current of the U-phase is detected in the switch interval T4. That is, in the configuration shown in each of FIG. 14 and FIG. 17, the time difference occurring in the case where the rotary electric machine currents are calculated based on the DC bus current is equal to a time difference between the switch interval T1 and the switch interval T2 which are adjacent to each other, as shown in FIG. 15(b) or FIG. 18(b). On the other hand, in the method in which the rotary electric machine currents are calculated based on the DC bus current, by using the position detection voltages Vuh, Vvh, and Vwh having the waveforms shown in FIG. 12, the time difference is equal to a time difference between the switch interval T1 and the switch interval T4 which are separated from each other by a distance of two switch intervals, as shown in FIG. 21(b). Thus, the values of the three-phase rotary electric machine currents may change significantly during the time difference, and there is possibility that an unignorable detection error occurs.

Figure 22:
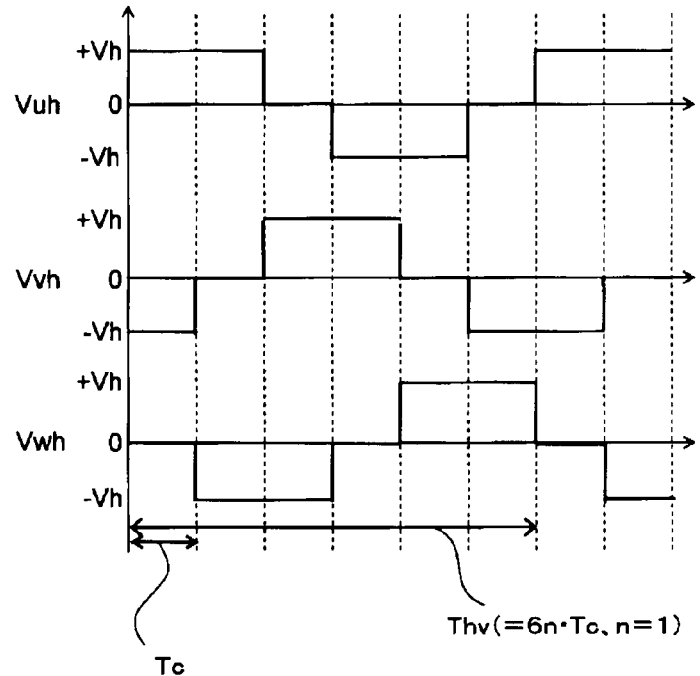
FIG. 22 is an explanatory diagram illustrating an operation of a controller according to an eighth embodiment of the present invention.

Thus, the eighth embodiment is directed to overcome the problem occurring in the seventh embodiment. That is, as to the position detection voltages Vuh, Vvh, and Vwh to be superimposed on the fundamental voltages Vu*, Vv*, and Vw*, although the position detection voltages Vuh, Vvh, and Vwh, having waveforms shown in FIG. 12, each have only two values, i.e., +Vh and −Vh, the position detection voltages Vuh, Vvh, and Vwh are each set, as shown in FIG. 22, for example, to have three values, i.e., +Vh, −Vh, and 0, whereby it is possible to calculate rotary electric machine currents based on the DC bus current. An overall configuration except for that above described is the same as the configuration according to the seventh embodiment shown in FIG. 20.

Figure 23:
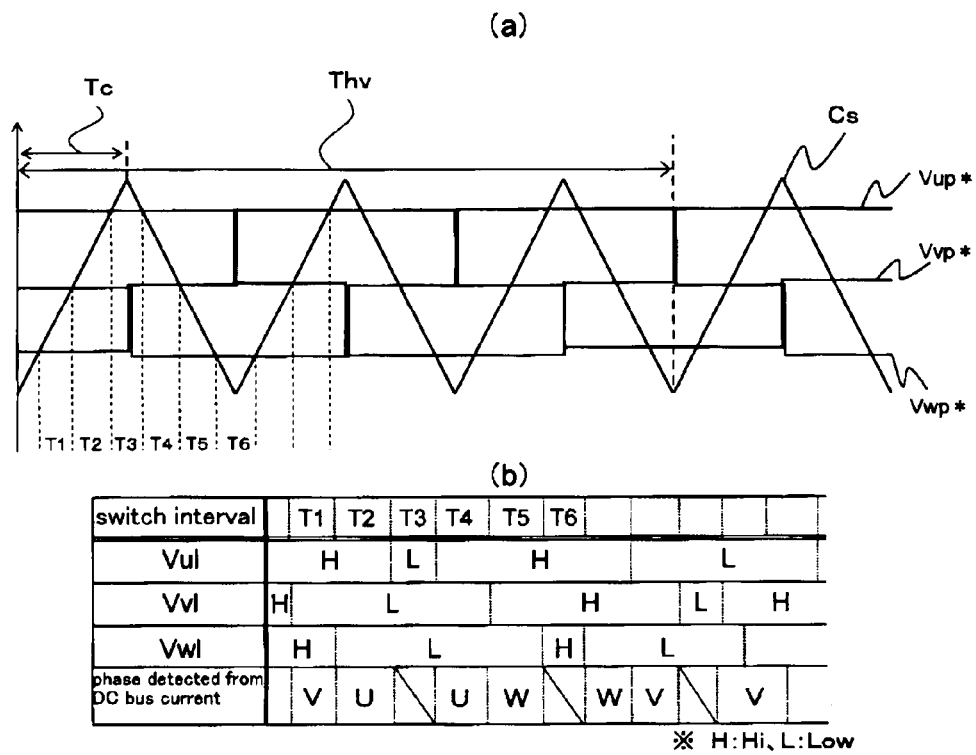
FIG. 23 is an explanatory diagram illustrating an operation in the eighth embodiment of the present invention.

Here, when the position detection voltages Vuh, Vvh, and Vwh each having three values as shown in FIG. 22 are superimposed, respectively, by an adder 41 of control means 4 shown in FIG. 20, then voltage commands Vup*, Vvp*, and Vwp*, which are resultant outputs, have waveforms as shown in FIG. 23(a). Logic signals Vul, Vvl, and Vwl outputted from the pulse-width modulation controller 15 in accordance with the voltage commands Vup*, Vvp*, and Vwp* are as shown in FIG. 23(b).

In this manner, by utilizing the position detection voltages Vuh, Vvh, and Vwh each having three values, i.e., +Vh, −Vh, and 0 shown in FIG. 22, it is possible to overcome the problem of the seventh embodiment, and also possible to reduce the detection interval of rotary electric machine currents of three phases to the switching cycle Tc.

It is noted that even if the position detection voltages Vuh, Vvh, and Vwh each having three values, i.e., +Vh, −Vh, and 0 shown in FIG. 22 are utilized, there may be a case where the voltage commands Vup*, Vvp*, and Vwp* become close to one another depending on the values of the fundamental voltages Vu*, Vv*, and Vw*, and consequently there occurs a switch interval in which rotary electric machine currents cannot be detected. In such a case, it is possible to detect the rotary electric machine currents, for example, by arranging position detection voltages Vuh, Vvh, and Vwh each having four values, i.e., +2Vh, +Vh, −2Vh, and −Vh, or by arranging position detection voltages Vuh, Vvh, and Vwh each having a continuously changing magnitude, such as a sine wave, that is, by arranging the position detection voltages Vuh, Vvh, and Vwh having a plurality of values.

It is noted that, in the eighth embodiment, in order to calculate the rotary electric machine currents from the DC bus current Idc, each of the position detection voltages Vuh, Vvh, and Vwh has three values, whereas a cycle of each voltage is always set to a cycle m·Tc which is equal to m times (m is an integer of three or more) of the switching cycle Tc. Accordingly, estimation calculation of the rotor position by the position estimation means 3 is not affected at all. Therefore, when the rotary electric machine currents are calculated based on the DC bus current Idc by utilizing the position detection voltages Vuh, Vvh, and Vwh, it is not necessary to mount a position sensor, and in addition, it is possible to reduce the number of the current sensors. Thus it is possible to achieve a controller of the rotary electric machine 1 having a simple and inexpensive configuration.

Ninth Embodiment

Figure 24:
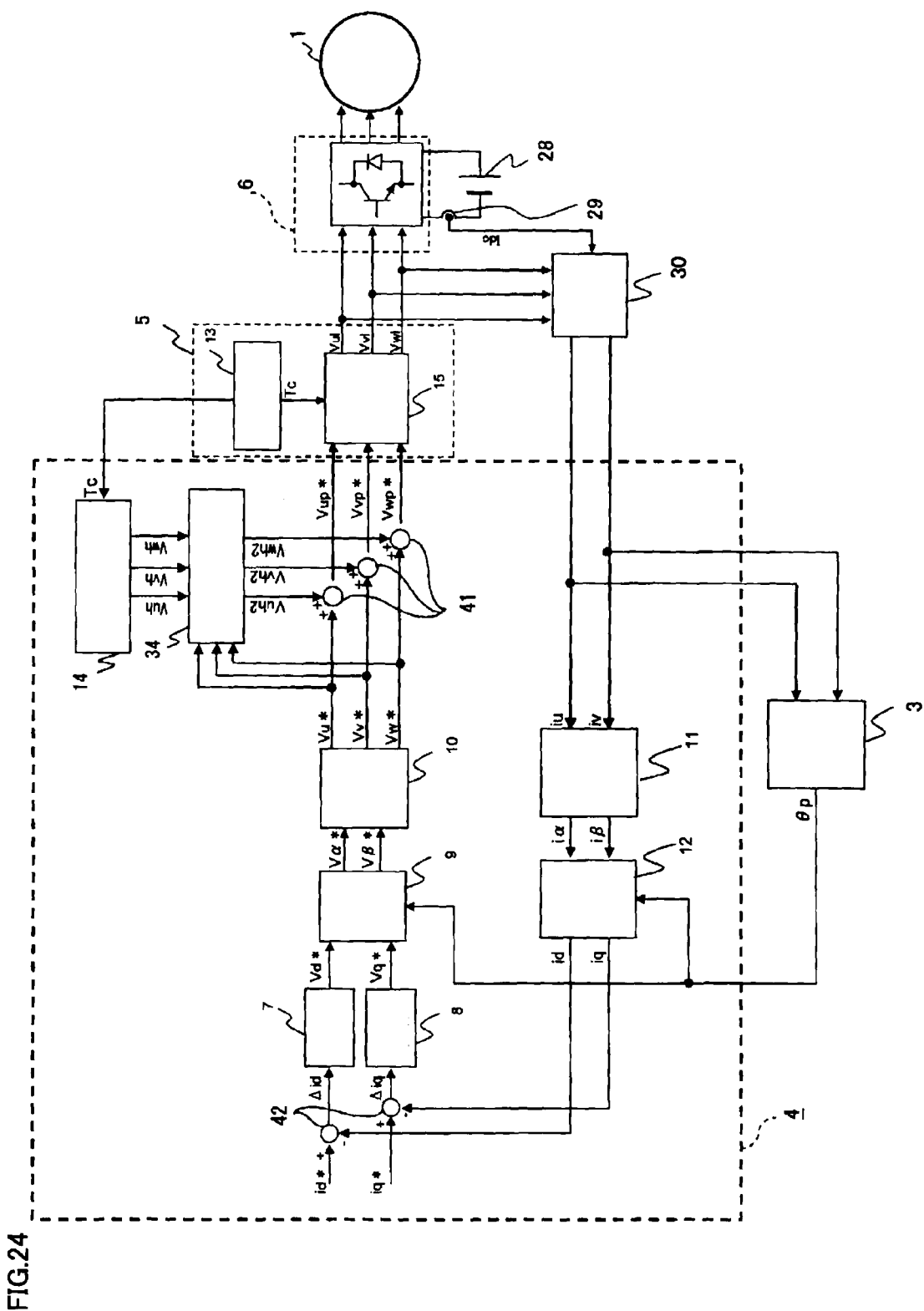
FIG. 24 is a block diagram showing a controller of a rotary electric machine according to a ninth embodiment of the present invention.

FIG. 24 is a block diagram showing a controller of a rotary electric machine according to a ninth embodiment of the present invention. Those component parts which correspond to the component parts of the seventh embodiment (FIG. 20) are provided with identical reference characters.

The controller of the rotary electric machine according to the ninth embodiment is based on the configuration according to the seventh embodiment (FIG. 20), and additionally includes, in a control means 4, a position detection voltage changer 34 in such a manner as to be interposed between a position detection voltage generator 14 and an adder 41.

The position detection voltage changer 34 receives fundamental voltages Vu*, Vv*, and Vw* for driving the rotary electric machine 1 outputted from a two-phase/three-phase converter 10, and changes, based on the fundamental voltages Vu*, Vv*, and Vw*, the amplitudes of position detection voltages Vuh, Vvh, and Vwh outputted from the position detection voltage generator 14, and then outputs the changed position detection voltages Vuh2, Vvh2, and Vwh2. The changed position detection voltages Vuh2, Vvh2, and Vwh2 outputted from the position detection voltage changer 34 are added to the fundamental voltages Vu*, Vv*, and Vw* by the adder 41.

In the case of the configuration according to the seventh embodiment (FIG. 20), when the values of the voltage commands Vup*, Vvp*, and Vwp* are close or identical to each other, it is extremely difficult to identify the phase in which a rotary electric machine current that is identical to the DC bus current is flowing, and consequently a current detection period extends. In addition, there may be a possibility of occurrence of a current detection error. In order to solve this problem, in the above eighth embodiment, it is configured such that the position detection voltages Vuh, Vvh, and Vwh each have three values, i.e., +Vh, −Vh, and 0, whereby the rotary electric machine currents can be calculated based on the DC bus current. On the other hand, in the ninth embodiment, in order to address the problem more dynamically than in the eighth embodiment, the amplitude of the position detection voltages Vuh, Vvh, and Vwh outputted from the position detection voltage generator 14 is changed based on the fundamental voltages Vu*, Vv*, and Vw*. The operating principle will be described below.

Figure 25:
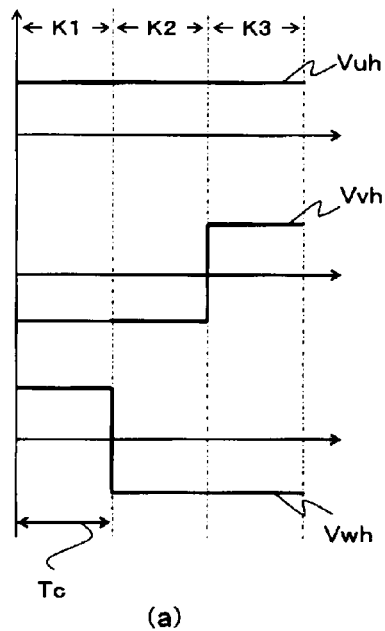
FIG. 25 is an explanatory diagram illustrating an operation of the controller of the rotary electric machine having a configuration shown in FIG. 24.
Figure 25:
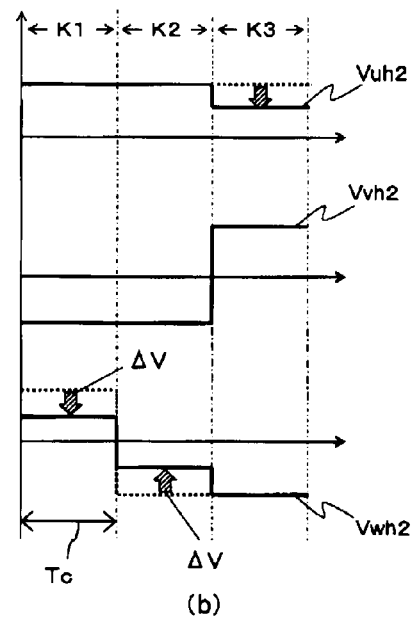
Figure 25:
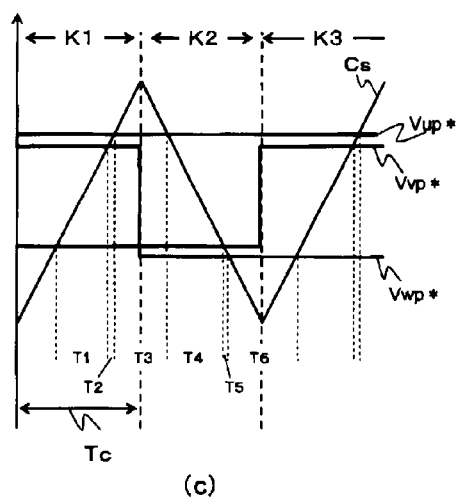
Figure 25:
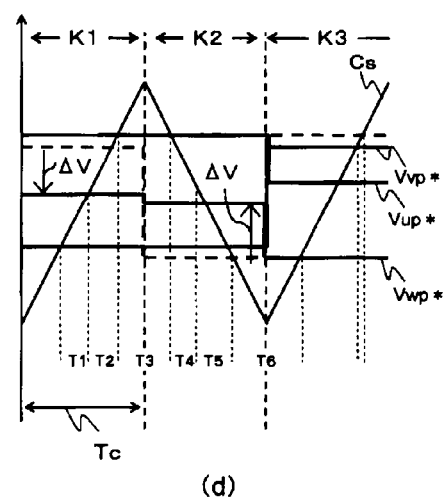

FIG. 25 is an explanatory diagram showing an operation of the position detection voltage changer 34. FIG. 25(a) shows output waveforms of the position detection voltages Vuh, Vvh, and Vwh outputted from the position detection voltage generator 14, and FIG. 25(b) shows output waveforms of the changed position detection voltages Vuh2, Vvh2, and Vwh2 outputted from the position detection voltage changer 34. It is noted that the position detection voltages Vuh, Vvh, and Vwh shown in FIG. 25(a) have the same waveforms (cycle Thv=6n·Tc, n=1) as the position detection voltages Vuh, Vvh, and Vwh shown in FIG. 12, respectively, and thus, K1 to K3 shown in FIG. 12 correspond to K1 to K3 shown in FIG. 25, respectively.

When the position detection voltages Vuh, Vvh, and Vwh shown in FIG. 25(a) outputted from the position detection voltage generator 14 are directly superimposed on the fundamental voltages Vu*, Vv*, and Vw* without being changed through the position detection voltage changer 34, the resultants have waveforms shown in FIG. 25(c), which are the same as the waveforms shown in FIG. 21(a)

In FIG. 25(c), among the voltage commands Vup*, Vvp*, and Vwp* which are obtained by superimposing the position detection voltages Vuh, Vvh, and Vwh on the fundamental voltages Vu*, Vv*, and Vw*, respectively, Vup* and Vvp* are close to each other in an interval K1. Accordingly, the period of a switch interval T2 is reduced, and it becomes impossible to identify the phase in which a rotary electric machine current that is identical to the DC bus current is flowing. In addition, in an interval K2, Vvp* and Vwp* are close to each other, and thus the period of a switch interval T5 is reduced, and it becomes impossible to identify the phase in which a rotary electric machine current that is identical to the DC bus current is flowing.

Thus, in the ninth embodiment, calculating in advance the periods of the switch intervals T1, T2, and the like of the position detection voltages Vuh, Vvh, and Vwh, based on the fundamental voltages Vu*, Vv*, and Vw*, the position detection voltage changer 34 checks whether or not there is a state where Vup*, Vvp*, and Vwp* are close or identical to one another, and thus the periods of the respective switch intervals T1, T2, and the like is reduced, and consequently it becomes impossible to identify the phase in which a rotary electric machine current that is identical to the DC bus current is flowing (hereinafter referred to as an unidentifiable state).

The above unidentifiable state indicates a state where the period of each of the switch intervals T1, T2, and the like is shorter than a calculation time of the rotary electric machine current calculation means 30. In addition, the period of each of the switch intervals T1, T2, and the like is proportional to the difference in values of the voltage commands Vup*, Vvp*, and Vwp*. Thus, it is possible to obtain the period of each of the switch intervals T1, T2, and the like from the sums of the fundamental voltages Vu*, Vv*, and Vw* and the position detection voltages Vuh, Vvh, and Vwh, respectively (=voltage commands Vup*, Vvp*, and Vwp*).

Therefore, when the period of each of the switch intervals T1, T2, and the like obtained through calculation is unidentifiable, the position detection voltage changer 34 changes, in each switching cycle Tc, a value of an amplitude of the position detection voltages Vuh, Vvh, and Vwh by an amount of ΔV so as to avoid the unidentifiable state, thereby outputting the changed position detection voltages Vuh2, Vvh2, and Vwh2.

The position detection voltage changer 34 changes a value of the position detection voltages Vuh, Vvh, and Vwh in a subsequent switching cycle such that the value changed in the preceding switching cycle is restored by an amount of ΔV, thereby outputting the changed position detection voltages Vuh2, Vvh2, and Vwh2. FIG. 25(d) shows changes in the voltage commands Vup*, Vvp*, and Vwp* of the respective phases in the case where the values of the position detection voltages Vuh, Vvh, and Vwh are changed in the above-described manner. The value for changing the position detection voltages Vuh, Vvh, and Vwh is calculated and obtained using Formula (15) below so that the period of each of the switch intervals T1, T2, and the like can be secured to be such a period that enables identification of the phase in which a rotary electric machine current that is identical to the DC bus current is flowing, that is, so that the period is equal to or more than the calculation time by the rotary electric machine current calculation means 30.

[Formula 15]

$$\Delta V \geq Kt \cdot \Delta Vp \qquad (15)$$

where,
ΔV: change amount of position detection voltage
Kt: proportional constant In the case of FIG. 25(c), for example, the position detection voltage changer 34 obtains, through calculation, the period of each of the switch intervals T1 and T2, in advance, and determines whether or not the switch interval T2 is unidentifiable. When it is determined that the switch interval T2 is unidentifiable as it is, in order to avoid the unidentifiable state, as indicated as an interval K1 in FIG. 25(d), the value of the position detection voltage Vwh of the W-phase is lowered by an amount of ΔV expressed in Formula (16) in accordance with Formula (15).

[Formula 16]

$$\Delta V = Kt \cdot (Vup^* - Vwp^*) \qquad (16)$$

In the interval K2 of the subsequent switching cycle, the value of the position detection voltage Vwh of the W-phase is raised by the amount of ΔV. As shown in FIG. 25(c), in the interval K2, Vvp* and Vwp* are close to each other, which leads to an unidentifiable state. Thus, the position detection voltage Vwh of the W-phase is raised, in the interval K2, by the amount of ΔV which is the amount of change performed in the interval K1. Accordingly, it is possible to avoid the unidentifiable state in the interval K2 shown in FIG. 25(d).

In an example shown in FIG. 25(d), the position detection voltage Vwh of the W-phase is changed by the amount of ΔV in the intervals K1 and K2. However, a similar effect can be obtained from a case where the position detection voltage Vwh of the W-phase is not changed, but the position detection voltage Vuh of the U-phase is changed by the amount of ΔV, or a case where the values of the position detection voltage Vwh of the W-phase and the position detection voltage Vuh of the U-phase are changed (by an amount of ΔV/2, respectively, for example) so as to be distanced from each other. In this case, however, there may be a case where Vvp* and Vwp* are kept close to each other in the interval K2, and thus, it is further necessary to change the position detection voltage Vvh or Vwh of the V-phase or the W-phase.

As above described, in the ninth embodiment, the position detection voltage changer 34 is arranged between the position detection voltage generator 14 and the adder 41, and with the position detection voltage changer 34, the difference in the voltage commands Vup*, Vvp*, and Vwp* of the respective phases is estimated based on the values of the fundamental voltages Vu*, Vv*, and Vw*. Based on the estimated difference in the respective phases, whether or not the unidentifiable state is present is determined, and when there is a possibility that the unidentifiable state will occur, the amplitudes of the position detection voltages Vuh, Vvh, and Vwh outputted from the position detection voltage generator 14 are changed. Accordingly, it is possible to calculate the rotary electric machine currents based on the DC bus current without deteriorating the driving performance of the rotary electric machine 1, and a further dynamic solution can be achieved as compared to the case of the eighth embodiment. Further, since only the amplitudes of the position detection voltages Vuh, Vvh, and Vwh are changed without changing the fundamental voltages Vu*, Vv*, and Vw*, it is possible to calculate the rotary electric machine currents based on the DC bus current Idc.

INDUSTRIAL APPLICABILITY

The present invention is applicable to a controller of a rotary electric machine such as an induction machine, a synchronous machine, or the like, and is capable of performing rotation control by obtaining rotor position information without using a rotor position sensor.

The invention claimed is:
1. A controller of a rotary electric machine performing rotation control of the rotary electric machine, comprising:
current detection means for detecting rotary electric machine currents flowing to the rotary electric machine;

position estimation means for estimating a rotor position in accordance with the rotary electric machine currents detected by the current detection means;

control means for outputting voltage commands in accordance with the rotor position estimated by the position estimation means;

pulse-width modulation means for outputting logic signals which are pulse-width modulated based on the voltage commands from the control means and on a switching cycle used for pulse-width modulation control; and voltage application means for applying voltages to the rotary electric machine in accordance with the logic signals outputted by the pulse-width modulation means, wherein the voltage commands outputted by the control means are obtained by superimposing, on fundamental voltages for driving the rotary electric machine, position detection voltages which each have a cycle equal to m times (m is an integer of three or more) of the switching cycle and which are different in phase among respective phases.

2. The controller of the rotary electric machine according to claim 1, wherein the control means includes:

a position detection voltage generator for generating the position detection voltages; and an adder for superimposing the position detection voltages outputted by the position detection voltage generator on the fundamental voltages and for outputting resultants as voltage commands to the pulse-width modulation means.

3. The controller of the rotary electric machine according to claim 2, wherein a cycle of each of the position detection voltages outputted by the position detection voltage generator is set to be 6n times (n is a natural number) of the switching cycle.

4. The controller of the rotary electric machine according to claim 2, wherein the control means has a speed calculation unit for calculating a rotation speed of the rotary electric machine in accordance with the rotor position estimated by the position estimation means, and for causing the position detection voltage generator to stop generating the position detection voltages when the rotation speed calculated by the speed calculation unit is equal to or greater than a predetermined value.

5. The controller of the rotary electric machine according to claim 1, wherein the current detection means is replaced with bus current detection means for detecting a bus current flowing between the voltage application means and a DC voltage source supplying DC power to the voltage application means, and with rotary electric machine current calculation means for calculating the rotary electric machine currents flowing to the rotary electric machine in accordance with the bus current detected by the bus current detection means, and with both or either of the logic signals and the voltage commands.

6. The controller of the rotary electric machine according to claim 5, wherein the position detection voltages generated by the position detection voltage generator have at least three amplitudes during a period of the switching cycle.

7. The controller of the rotary electric machine according to claim 5, wherein the control means includes a position detection voltage changer for changing the amplitudes of the position detection voltages generated by the position detection voltage generator in accordance with the fundamental voltages, and generates changed position detection voltages to be outputted to the adder.

8. The controller of the rotary electric machine according to claim 1, wherein the position estimation means extracts, from the rotary electric machine currents, position detection alternating currents which are obtained by superimposing, on the fundamental voltages, the position detection voltages or the changed position detection voltages, and estimates the rotor position in accordance with the extracted position detection alternating currents.

9. The controller of the rotary electric machine according to claim 8, wherein the position estimation means includes:

a three-phase/two-phase converter for performing three-phase/two-phase conversion of rotary electric machine currents of three phases, the currents flowing to the rotary electric machine;

a Fourier transformer for extracting the position detection alternating currents from two phase currents which are outputted by the three-phase/two-phase converter;

a multiplier for squaring each of the position detection alternating currents of two phases extracted by the Fourier transformer; and a position calculation unit for outputting the rotor position in accordance with respective outputs by the multiplier.

10. A controller of a rotary electric machine performing rotation control of the rotary electric machine, comprising:

current detection means for detecting rotary electric machine currents flowing to the rotary electric machine;

position estimation means for estimating a rotor position in accordance with the rotary electric machine currents detected by the current detection means;

control means for outputting voltage commands in accordance with the rotor position estimated by the position estimation means;

pulse-width modulation means for outputting logic signals which are pulse-width modulated based on the voltage commands from the control means and on a switching cycle used for pulse-width modulation control; and voltage application means for applying voltages to the rotary electric machine in accordance with the logic signals outputted by the pulse-width modulation means, wherein the voltages outputted by the voltage application means are obtained by superimposing position detection voltages which each have a cycle equal to m times (m is an integer of three or more) of the switching cycle and which are different in phase among respective phases.

* * * * *